United States Patent [19]
Laser

[11] Patent Number: 5,811,828
[45] Date of Patent: Sep. 22, 1998

[54] PORTABLE READER SYSTEM HAVING AN ADJUSTABLE OPTICAL FOCUSING MEANS FOR READING OPTICAL INFORMATION OVER A SUBSTANTIAL RANGE OF DISTANCES

[75] Inventor: Vadim Laser, Cincinnati, Ohio

[73] Assignee: Norand Corporation, Cedar Rapids, Iowa

[21] Appl. No.: 869,475

[22] Filed: Jun. 5, 1997

Related U.S. Application Data

[63] Continuation of Ser. No. 643,197, May 6, 1996, abandoned, which is a continuation of Ser. No. 408,338, Mar. 22, 1995, abandoned, which is a continuation of Ser. No. 292,705, Jul. 28, 1994, abandoned, which is a continuation of Ser. No. 947,673, Sep. 21, 1992, abandoned, which is a continuation-in-part of Ser. No. 822,332, Jan. 17, 1992, abandoned, which is a continuation-in-part of Ser. No. 761,046, Sep. 17, 1991, abandoned.

[51] Int. Cl.$^6$ ........................................................ G06K 7/10
[52] U.S. Cl. ........................ 250/566; 250/201.4; 235/462
[58] Field of Search ................................. 250/566, 201.4, 250/234, 235

[56] References Cited

U.S. PATENT DOCUMENTS

| | | | |
|---|---|---|---|
| 4,101,072 | 7/1978 | Weaver et al. | 235/455 |
| 4,136,821 | 1/1979 | Sugiura et al. | 250/568 |
| 4,188,103 | 2/1980 | Biber et al. | 354/27 |
| 4,210,802 | 7/1980 | Sakai | 235/462 |
| 4,282,425 | 8/1981 | Chadima et al. | 235/462 |
| 4,323,925 | 4/1982 | Abell et al. | 313/376 |
| 4,335,302 | 6/1982 | Robillard | 235/462 |
| 4,389,103 | 6/1983 | Kramer | 353/25 |
| 4,422,745 | 12/1983 | Hopson | 235/462 |
| 4,488,679 | 12/1984 | Bockholt et al. | 235/472 |
| 4,500,776 | 2/1985 | Laser | 235/494 |
| 4,516,017 | 5/1985 | Hara et al. | 235/472 |
| 4,570,057 | 2/1986 | Chadima et al. | 235/472 |
| 4,578,571 | 3/1986 | Williams | 235/472 |
| 4,603,262 | 7/1986 | Eastman et al. | 250/566 |
| 4,660,096 | 4/1987 | Arlan et al. | 358/310 |
| 4,874,933 | 10/1989 | Sanner | 235/462 |

(List continued on next page.)

FOREIGN PATENT DOCUMENTS

| | | |
|---|---|---|
| 0085495 | 8/1983 | European Pat. Off. . |
| 0217665 | 4/1987 | European Pat. Off. . |
| 0384955 | 9/1990 | European Pat. Off. . |
| 0385478 | 9/1990 | European Pat. Off. . |
| 0422952 | 4/1991 | European Pat. Off. . |
| 6367692 | 3/1988 | Japan . |
| 8906017 | 6/1989 | WIPO . |

*Primary Examiner*—Que Le
*Attorney, Agent, or Firm*—Suiter & Associates PC

[57] ABSTRACT

A portable optical reader system for reading optical information over a substantial range of distances includes a casing having a light receiving opening for alignment with optical information. Further included is a reading sensor for converting a reflected light image of optical information into an information signal and reflected light optical elements for forming a reflected light image. The optical system is adjustable to tend to focus a reflected light image of optical information, located within a substantial range of distances, onto the reading sensor. A light beam generator is associated with the casing and directed relative to the optical elements and the light receiving opening such that a light beam generated thereby will impinge on an information carrier, having optical information to be read, and will be reflected therefrom through the light receiving opening and via the optical elements to the reading sensor. Since the position of impingement of the reflected light beam on the reading sensor is a function of the range of the information carrier from the image sensor, the optical system may be adjusted to focus a reflected light image of optical information associated with the information carrier, at least in part, according to the position of impingement of the reflected light beam on the reading sensor.

18 Claims, 35 Drawing Sheets

Microfiche Appendix Included
(3 Microfiche, 159 Pages)

U.S. PATENT DOCUMENTS

| | | | |
|---|---|---|---|
| 4,877,949 | 10/1989 | Danielson . | |
| 4,900,907 | 2/1990 | Matusima et al. | 235/462 |
| 5,075,539 | 12/1991 | Shiraishi | 250/208.1 |
| 5,081,343 | 1/1992 | Chadima, Jr. et al. | 235/462 |
| 5,130,520 | 7/1992 | Shepard et al. | 235/472 |
| 5,159,455 | 10/1992 | Cox et al. | 250/208.1 |
| 5,192,856 | 3/1993 | Schaham | 235/462 |
| 5,210,398 | 5/1993 | Metlitsky | 235/462 |
| 5,378,883 | 1/1995 | Batterman et al. | 235/472 |
| 5,414,251 | 5/1995 | Durbin | 235/462 |
| 5,442,167 | 8/1995 | Cornelius et al. | 250/201.2 |
| 5,468,950 | 11/1995 | Hanson | 235/472 |
| 5,500,516 | 3/1996 | Durbin | 235/472 |
| 5,534,684 | 7/1996 | Danielson | 235/472 |
| 5,550,364 | 8/1996 | Rudeen | 235/462 |
| 5,576,529 | 11/1996 | Koenck et al. | 235/472 |
| 5,598,007 | 1/1997 | Bunce et al. | 250/566 |
| 5,627,360 | 5/1997 | Rudeen | 235/462 |
| 5,640,001 | 6/1997 | Danielson et al. | 235/472 |

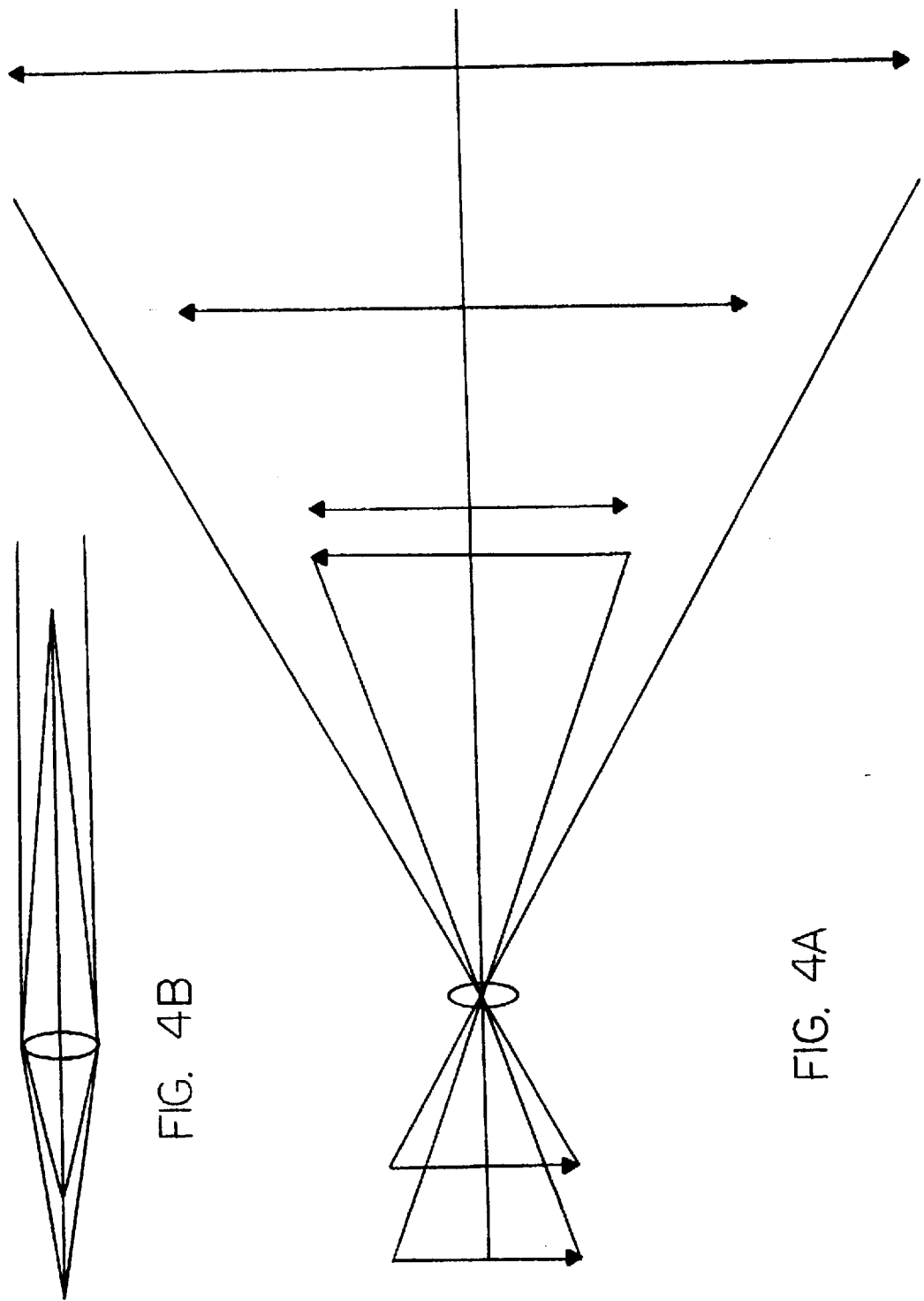

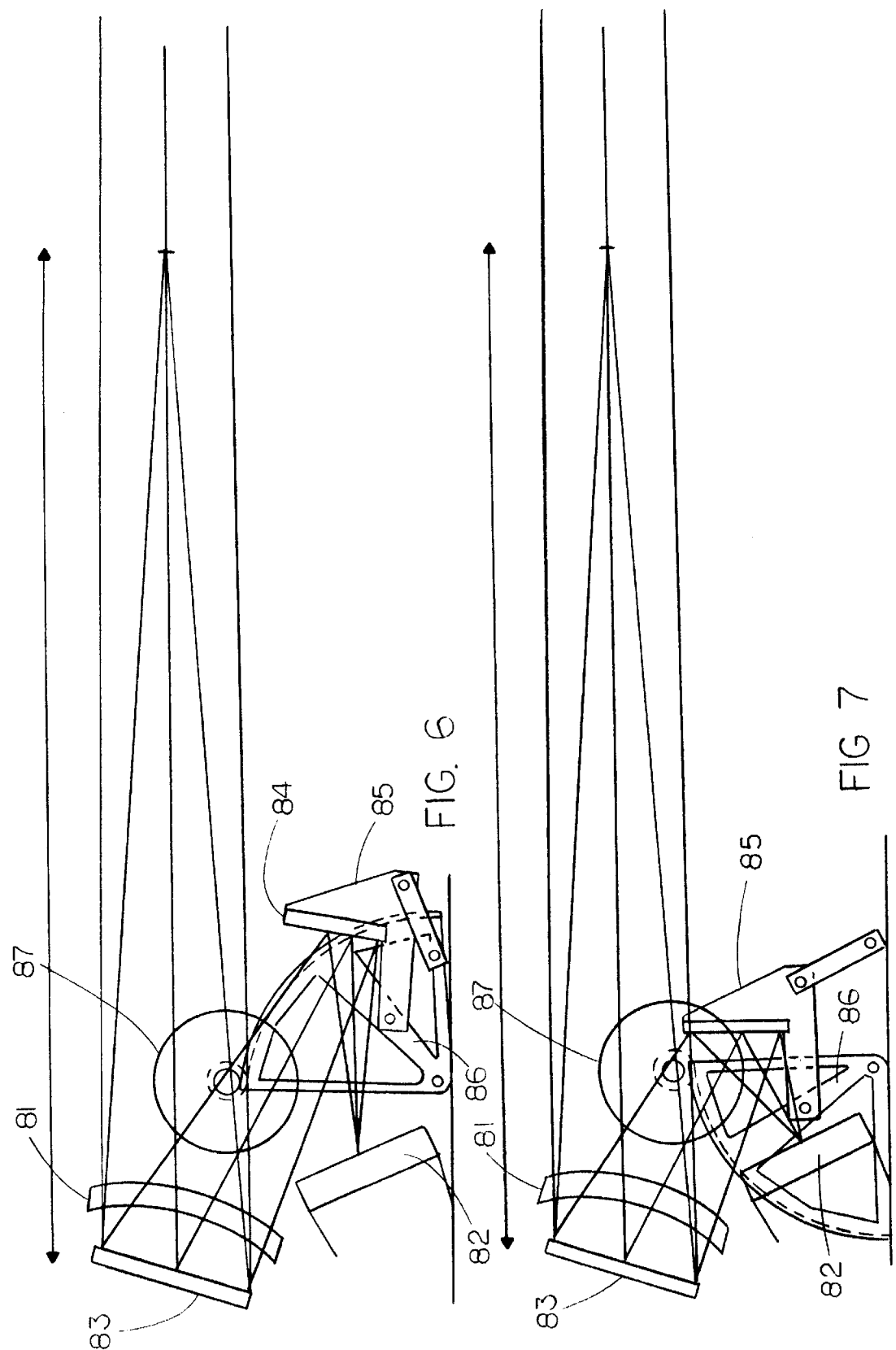

PORTABLE READER SYSTEM HAVING AN ADJUSTABLE OPTICAL FOCUSING MEANS FOR READING OPTICAL INFORMATION OVER A SUBSTANTIAL RANGE OF DISTANCES

CROSS REFERENCE TO RELATED APPLICATION

This application is a continuation of application Ser. No. 08/643,197, filed May 6, 1996, abandoned, which is a continuation of U.S. application Ser. No. 08/408,338, filed Mar. 22, 1994, now abandoned, which is a continuation of U.S. application Ser. No. 08/292,705 filed Jul. 28, 1994, now abandoned, which is a continuation of U.S. application Ser. No. 07/947,673 filed Sep. 21, 1992, now abandoned, which in turn was a continuation-in-part of U.S. application Ser. No. 07/822,332 filed on Jan. 17, 1992, now abandoned, which in turn was a continuation-in-part of U.S. application Ser. No. 07/761,046 filed on Sep. 17, 1991, now abandoned.

TECHNICAL FIELD

The present invention is directed to optical information readers and more particularly to portable optical reader systems for instantaneously reading optical information over a substantial range of distances.

MICROFICHE APPENDIX

This application includes a microfiche appendix, of three microfiche having a total of 159 frames.

DESCRIPTION OF THE PRIOR ART

Many industries designate their products with optically readable information such as bar code symbols consisting of a series of lines and spaces of varying widths. Various bar code readers and laser scanning systems have been employed to decode the symbol pattern to a multiple digit representation for inventory and checkout purposes.

Old in the art are conventional contact and non-contact wand and pen bar code readers. However, these devices are incapable of instantaneously reading optical information.

Portable instantaneous optical information readers are also known to the art, e.g., as represented by Danielson and Durbin U.S. Pat. No. 4,877,949 assigned to the assignee herein.

Therefore, it is a principal object of the present invention to provide an improved portable optical reader system for reading optical information over a substantial range of distances.

Another object of the present invention is to provide a new ranging system for portable optical readers which enables optical information to be read instantaneously over a substantial range of distances.

Another object of the present invention is to provide a portable optical reader system which is capable of rapid and efficient alignment with optical information located a substantial distance from the reader.

A further object of the present invention is to provide a portable optical reader system which is easy to use, simple in construction, and trouble free. Other objects will be apparent to those skilled in the art from the detailed disclosure.

SUMMARY OF THE INVENTION

The present invention provides a novel system capable of instantaneously reading optically readable information over a substantial range of distances. A preferred embodiment comprises a hand-held data collection terminal with a combined reader and RF module which includes a casing having a light receiving opening for alignment with optical information. Housed within the casing are optical means which include light generating means and reflected light collecting means for forming a reflected light image. Also included are reading sensor means for converting a reflected light image of optical information into an information signal. The optical means is adjustable such that a reflected light image of optical information, located within a substantial range of distances, is focused onto the reading sensor means.

Light beam generating means is provided for range finding. The light beam generating means is associated with the casing and directed relative to the optical means and the light receiving opening so that a light beam generated by the generating means may be caused to impinge on the surface of an information carrier displaying optical information to be read and will then be reflected from the carrier into the light receiving opening through the collecting means to the reading sensor means. The system is so configured that the position of impingement of the reflected light beam on the reading sensor means is a function of the range of the information carrier. Accordingly, focal adjustments may be made based on position information from the reading sensor for focusing the image of optical information onto the reading sensor means. In a preferred arrangement, control means may be provided for accomplishing such adjustments according to the position of impingement of a pair of reflected light beams on the reading sensor means.

DETAILED DESCRIPTION OF THE DRAWINGS

Other objects and advantages of the invention will become apparent upon reading the following detailed description and upon reference to the drawings, in which:

FIG. 1 is a top plan diagrammatic view of an embodiment of a portable optical reader system for reading optical information over a substantial range of distances;

FIG. 2A, 2B, and 2C are graphical representations of waveforms illustrating the output of a CCD image sensor under various conditions of focus adjustment and object distance, and with the distance measurement beams active;

FIGS. 3A, 3B, and 3C are graphical representations of waveforms as a function of time illustrating the output of a CCD image sensor at zones A, B, and C, respectively, of FIG. 1;

FIGS. 4A and 4B are ray diagrams illustrating the viewed range of an object located at a given distance from the window of an embodiment of the present invention, FIG. 4B is a side elevational tracing, and FIG. 4A is a top plan tracing;

FIGS. 6 and 7 are side elevational views of a preferred optical system illustrating the optical system of the present invention focused at zero inch and (twenty) inches respectively;

Figure 12:
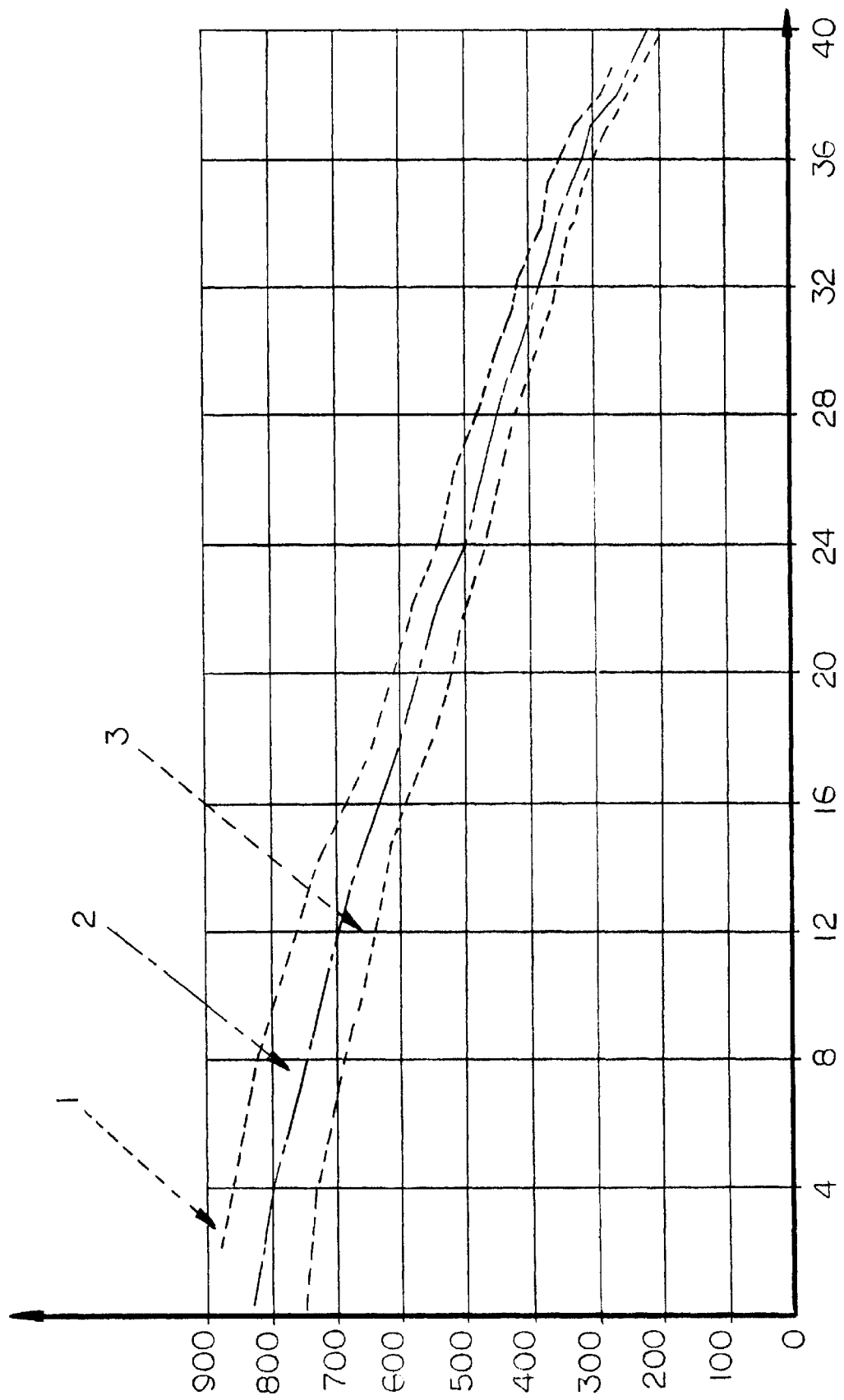
Figure 13:
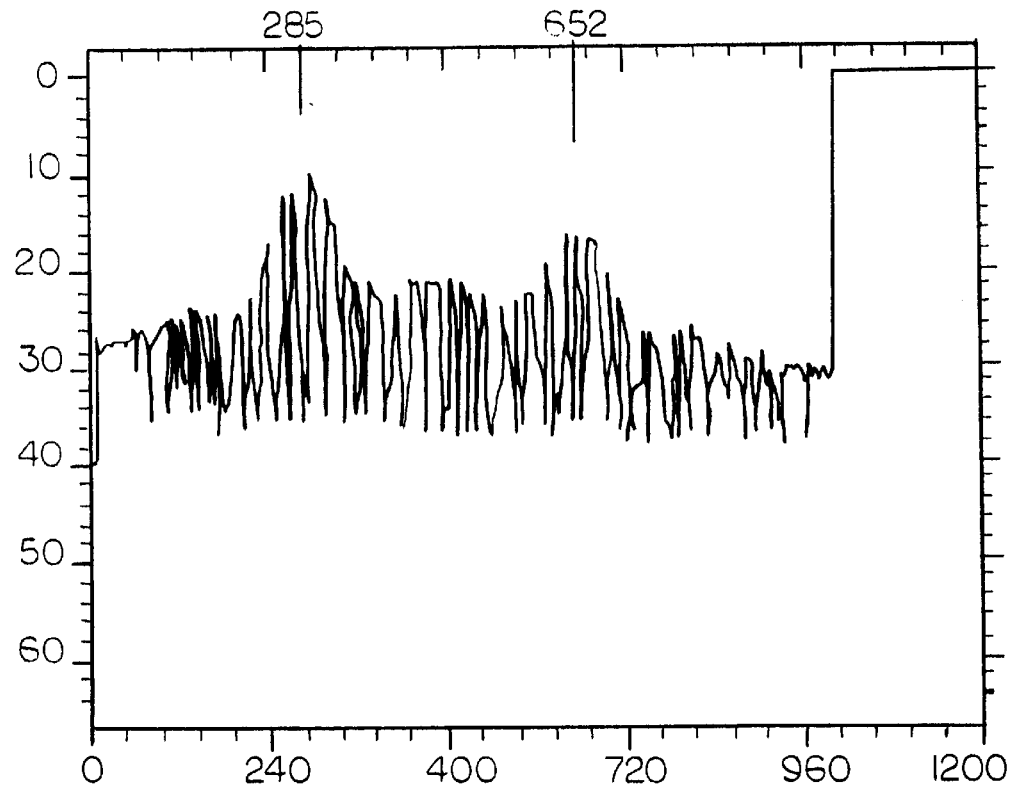
Figure 14:
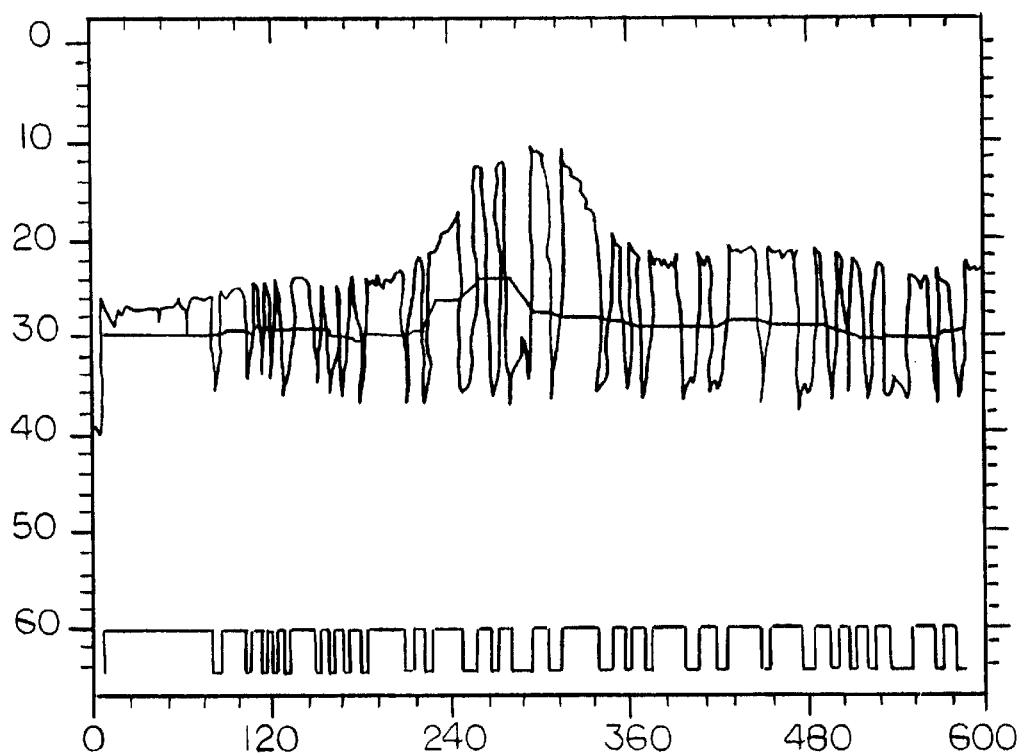
Figure 15:
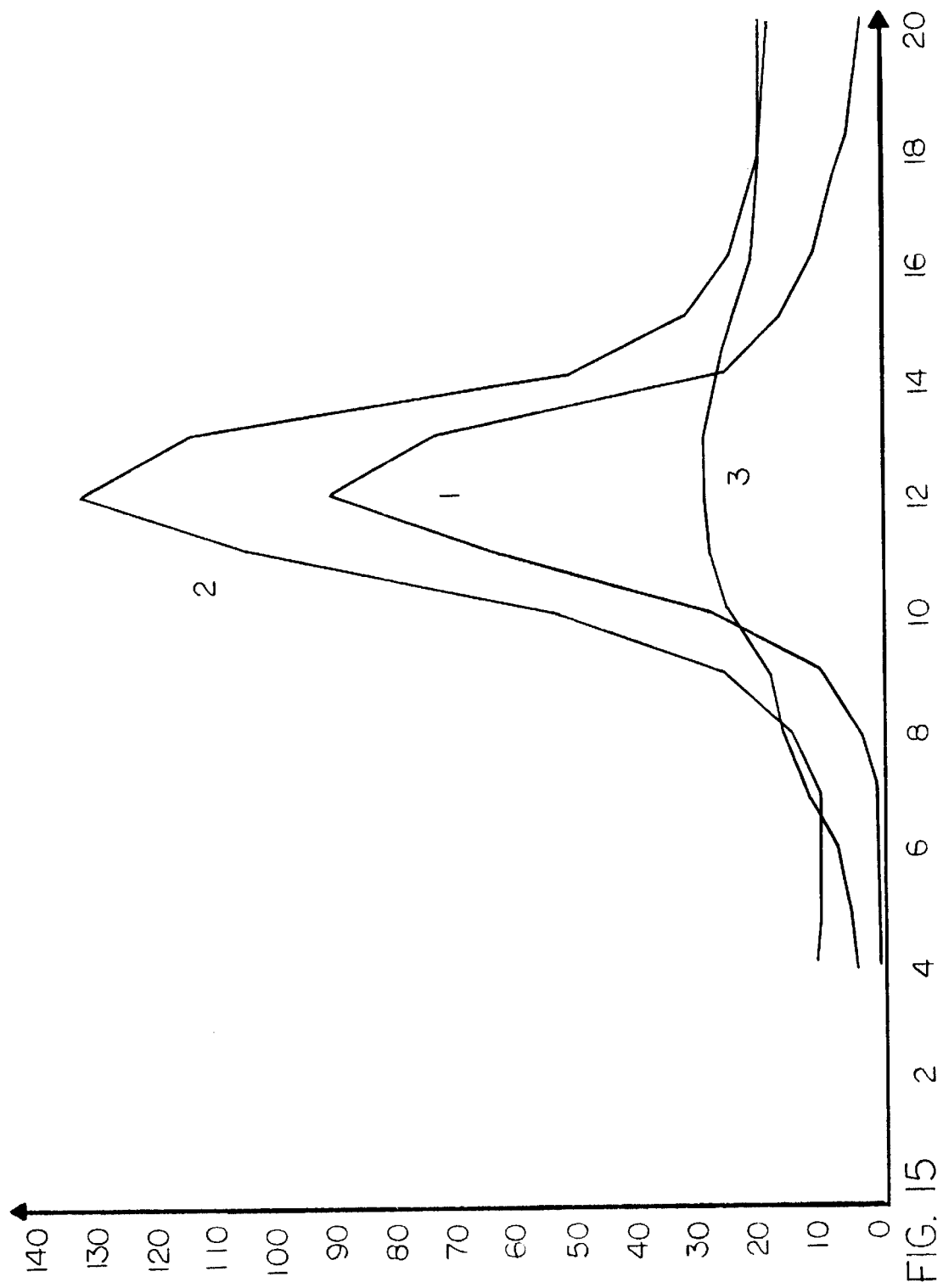
Figure 16:
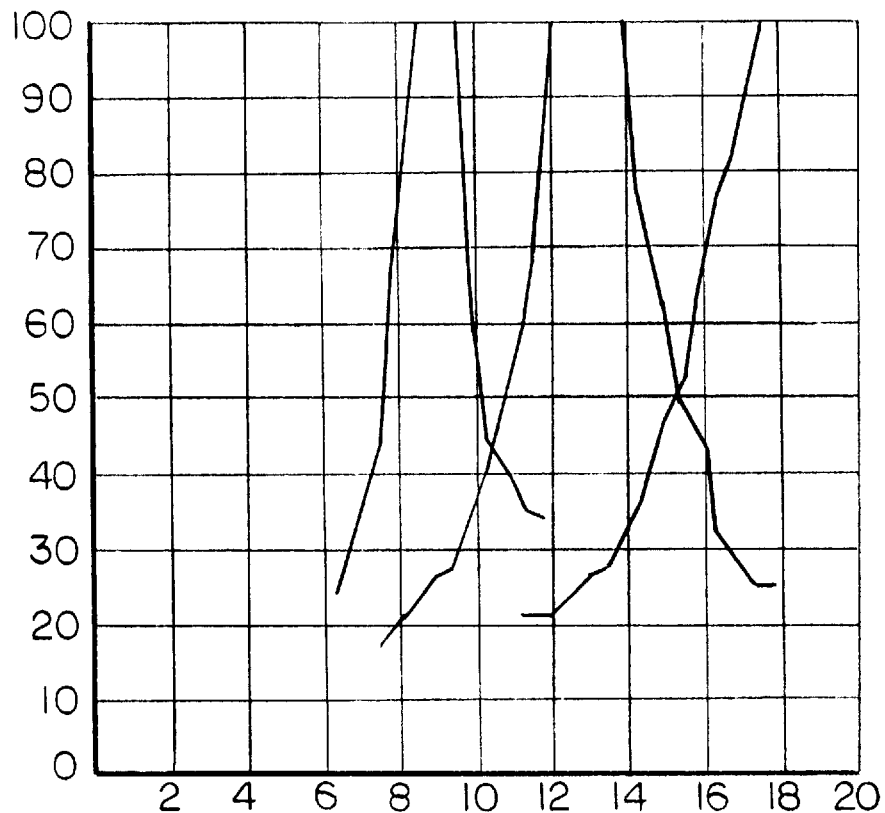
Figure 17:
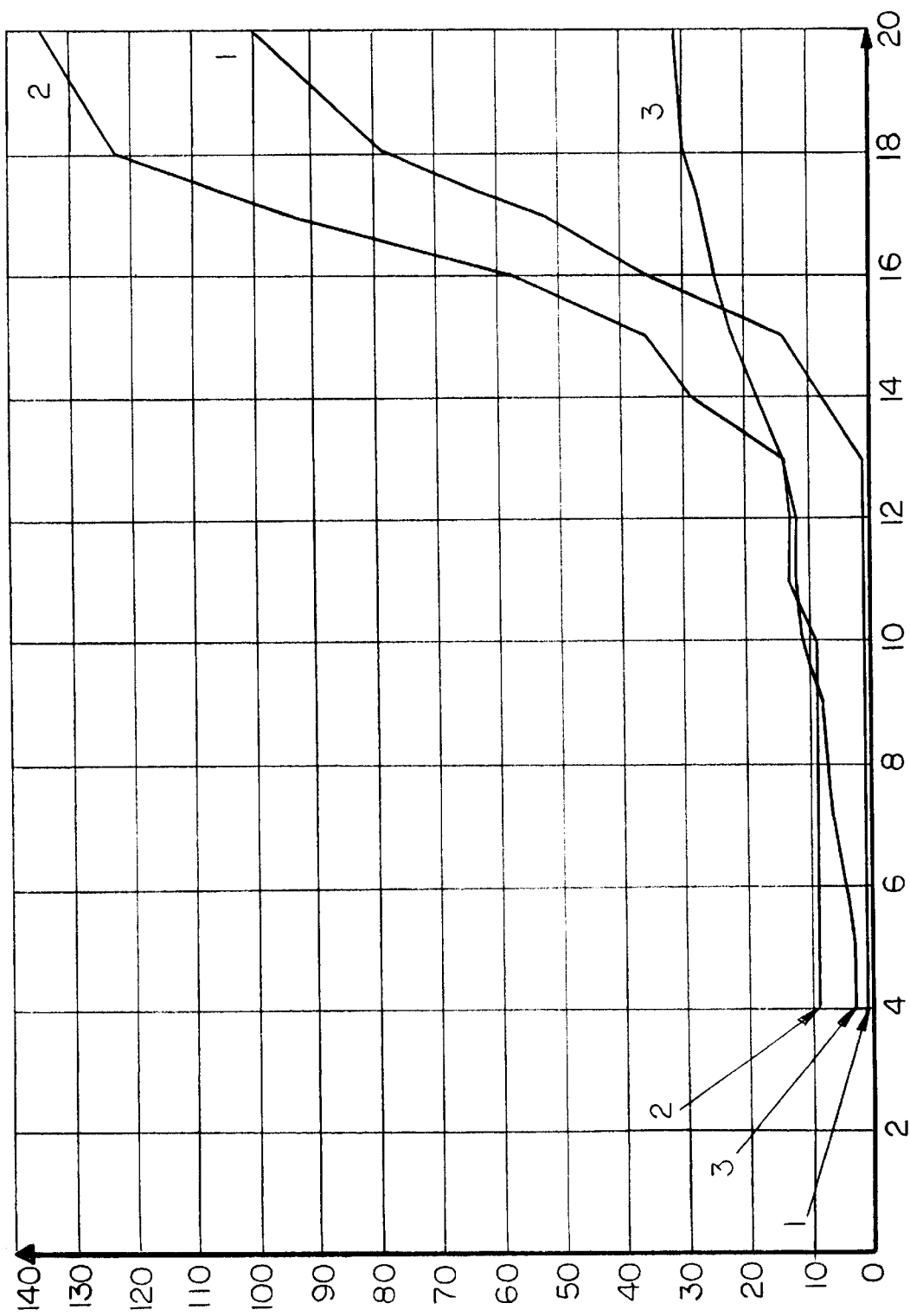
Figure 18:
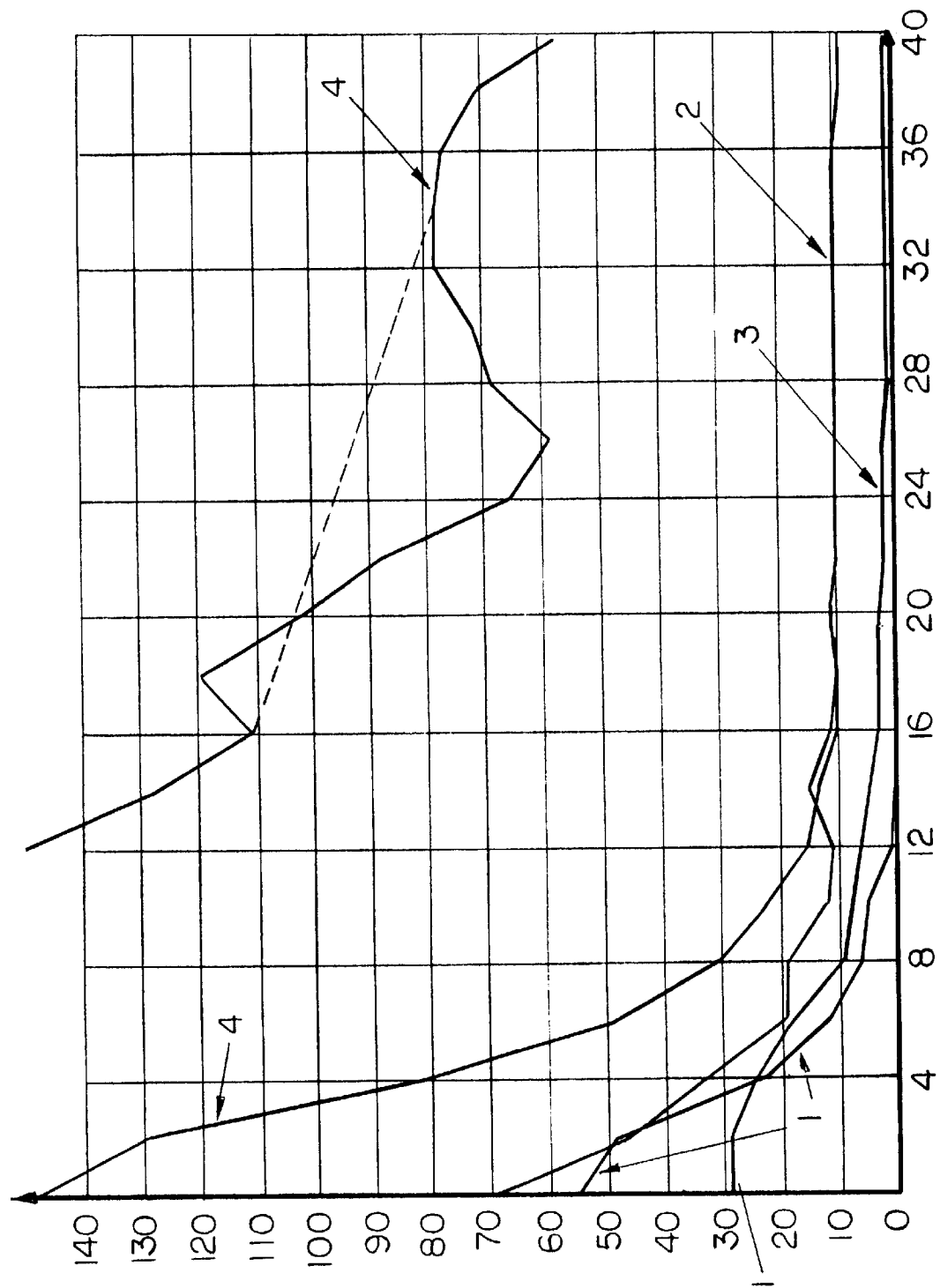
Figure 19:
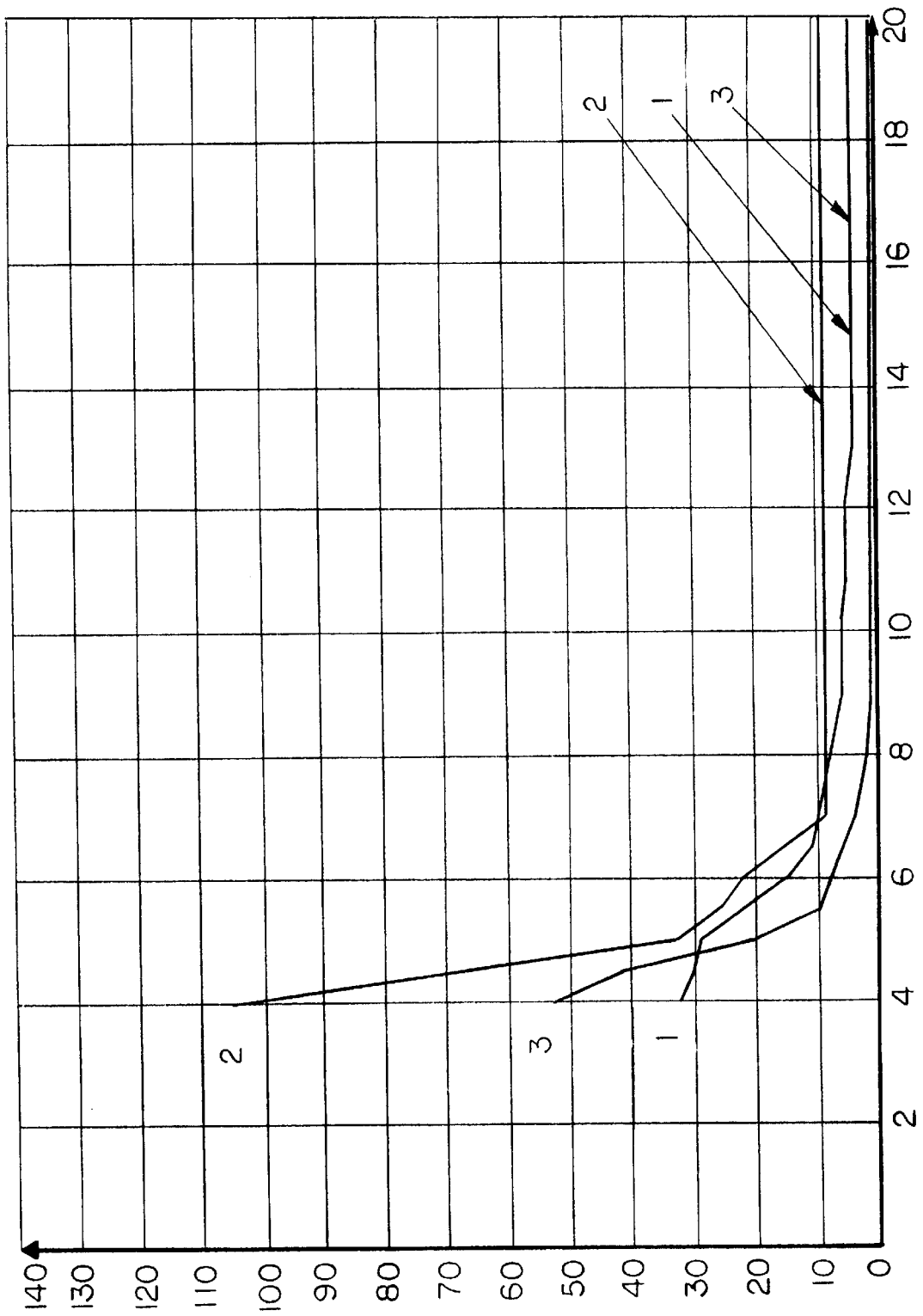
Figure 20:
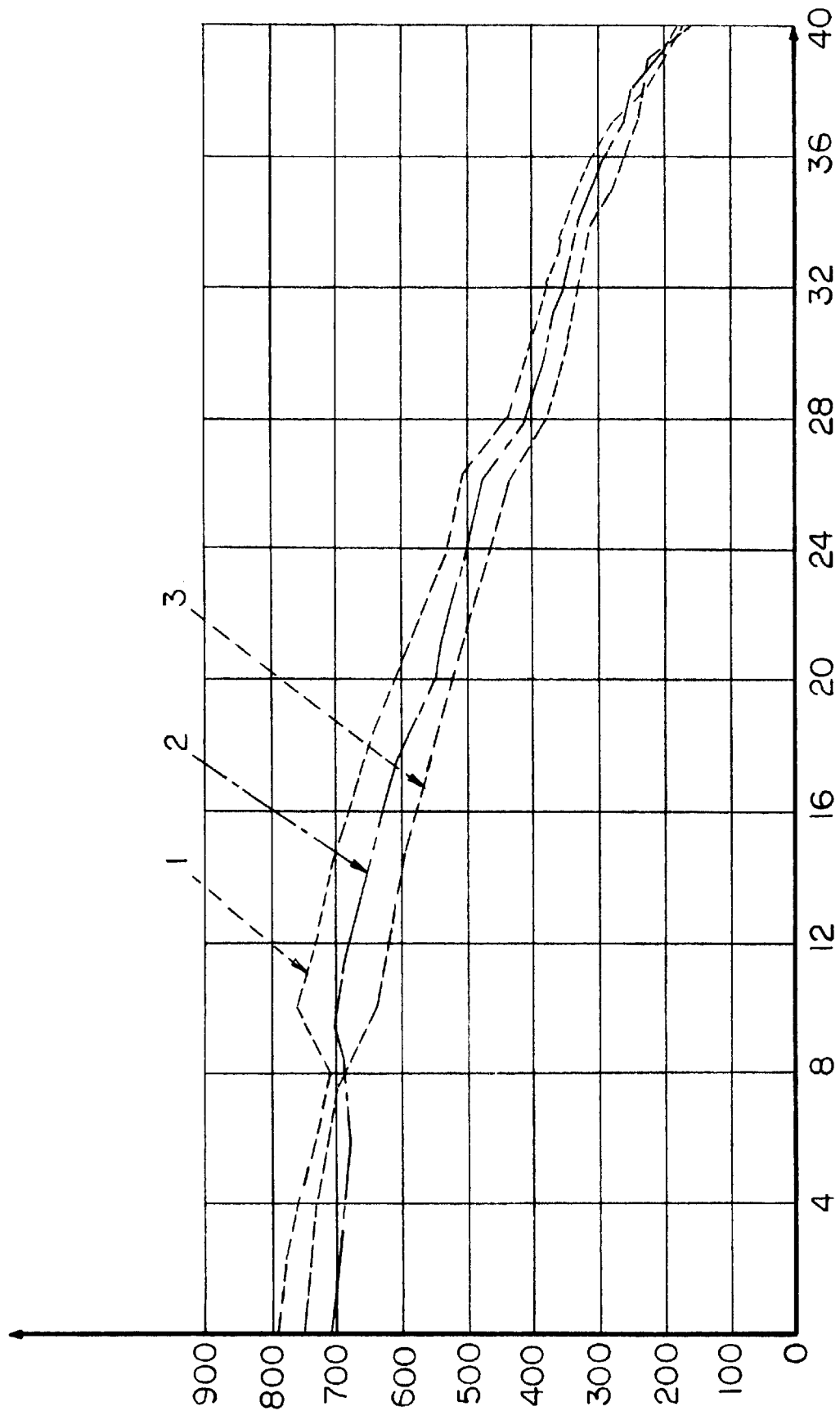
Figure 21:
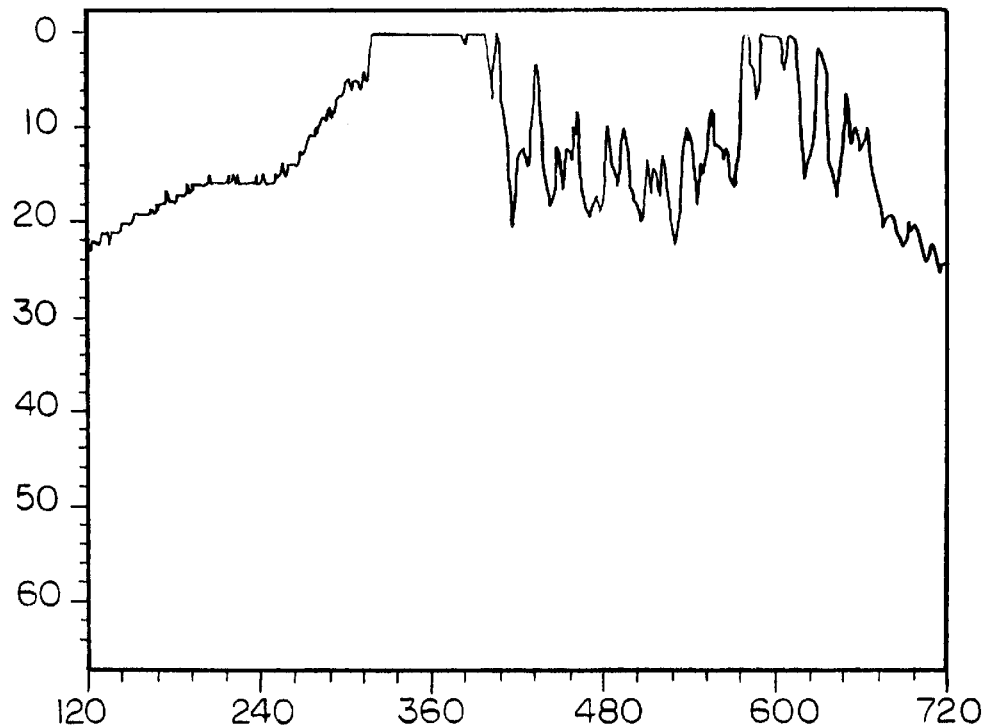
Figure 22:
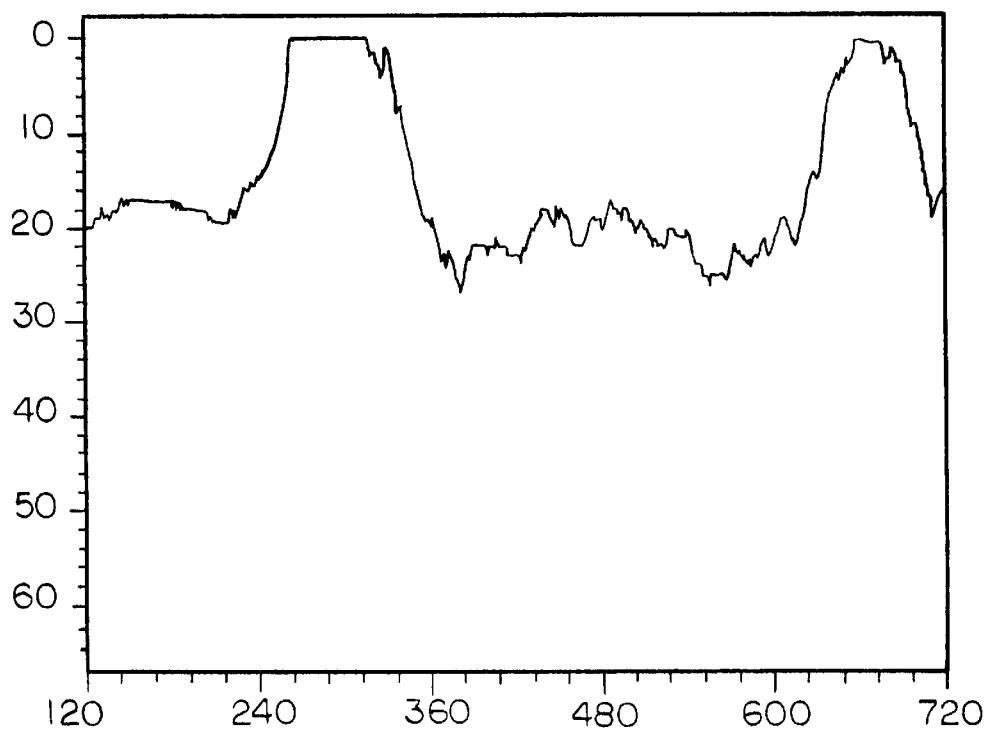
Figure 23:
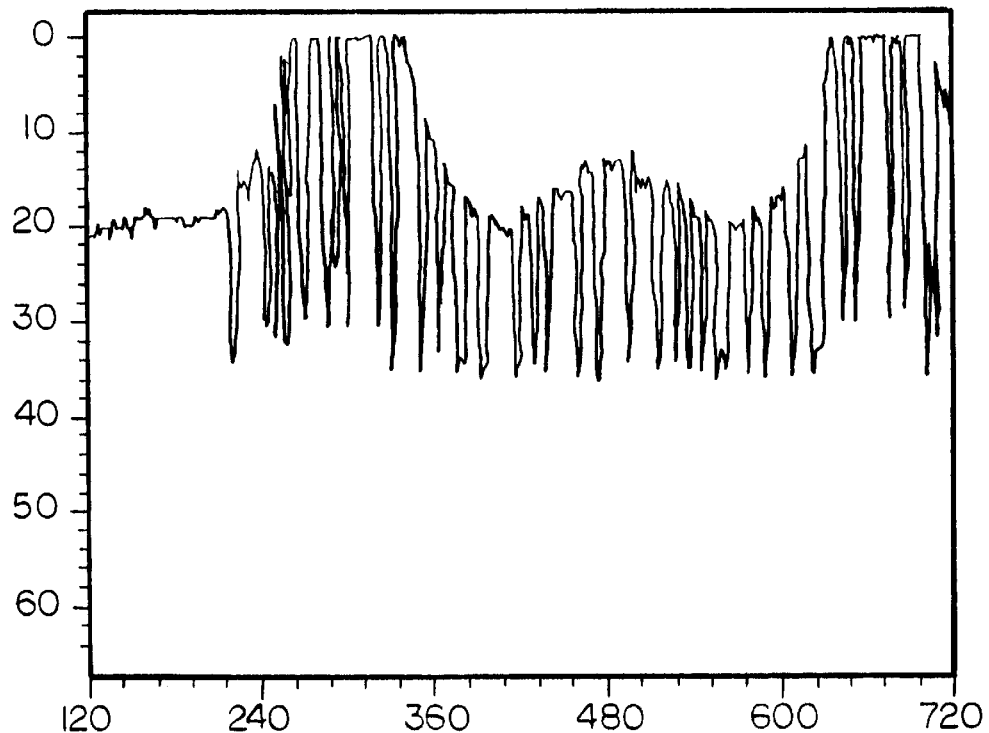
Figure 24:
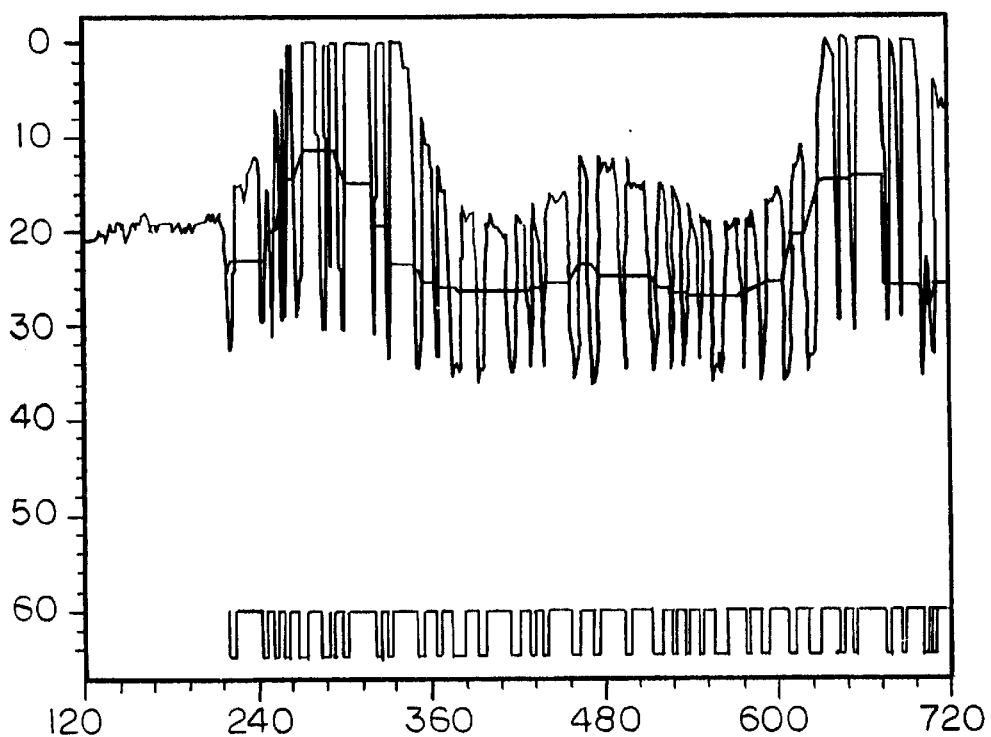
Figure 25:
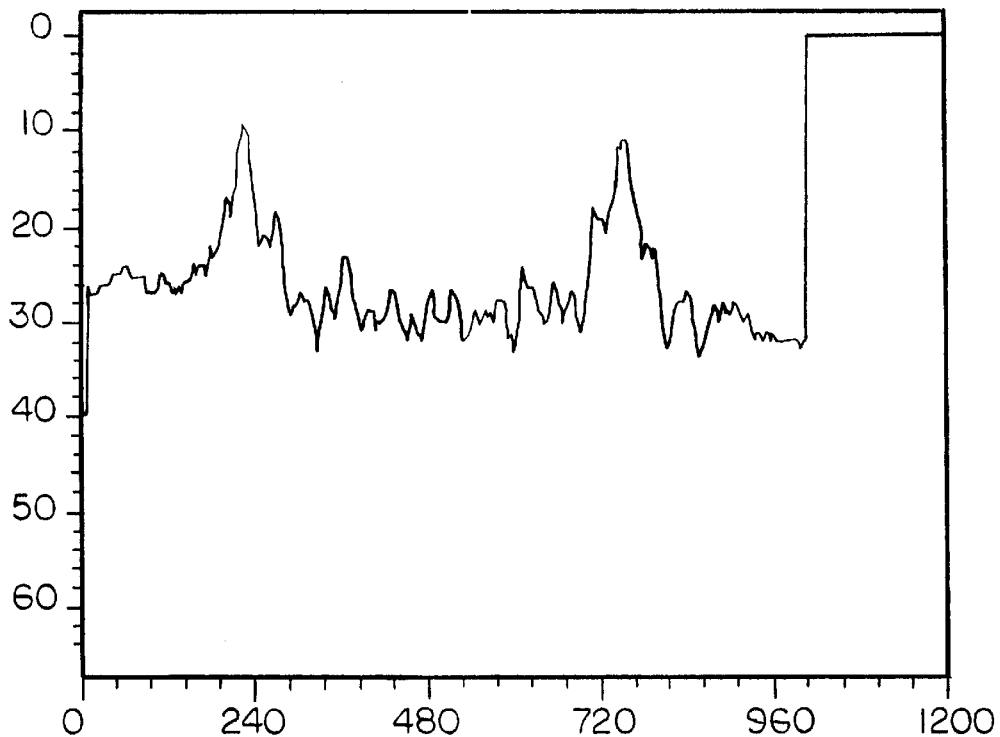
Figure 26:
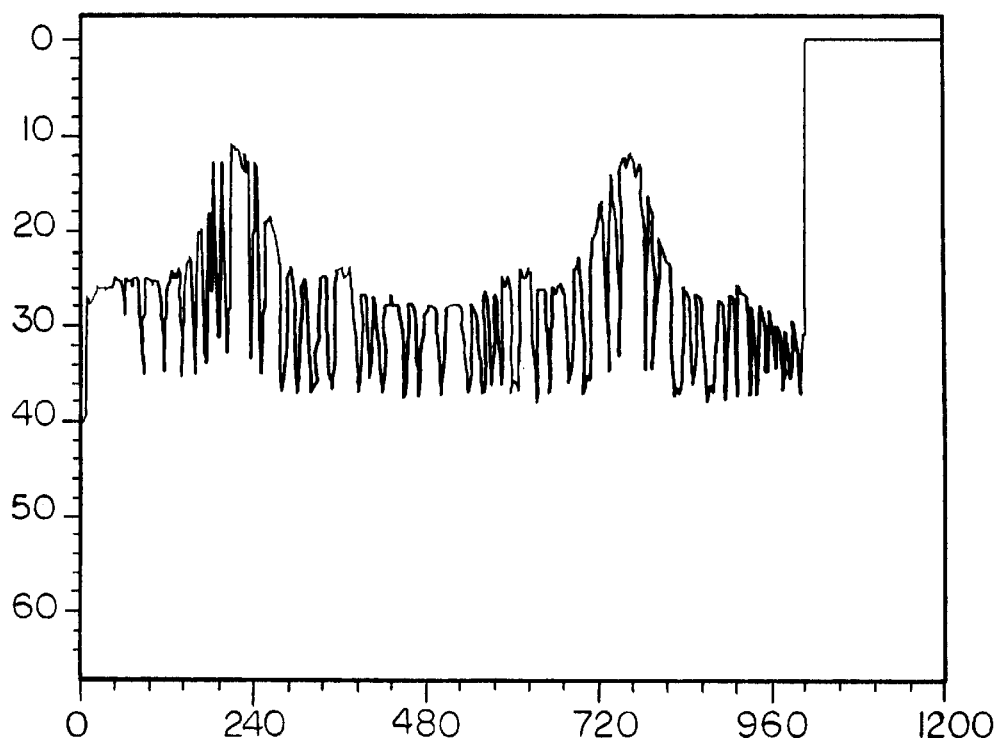
Figure 27:
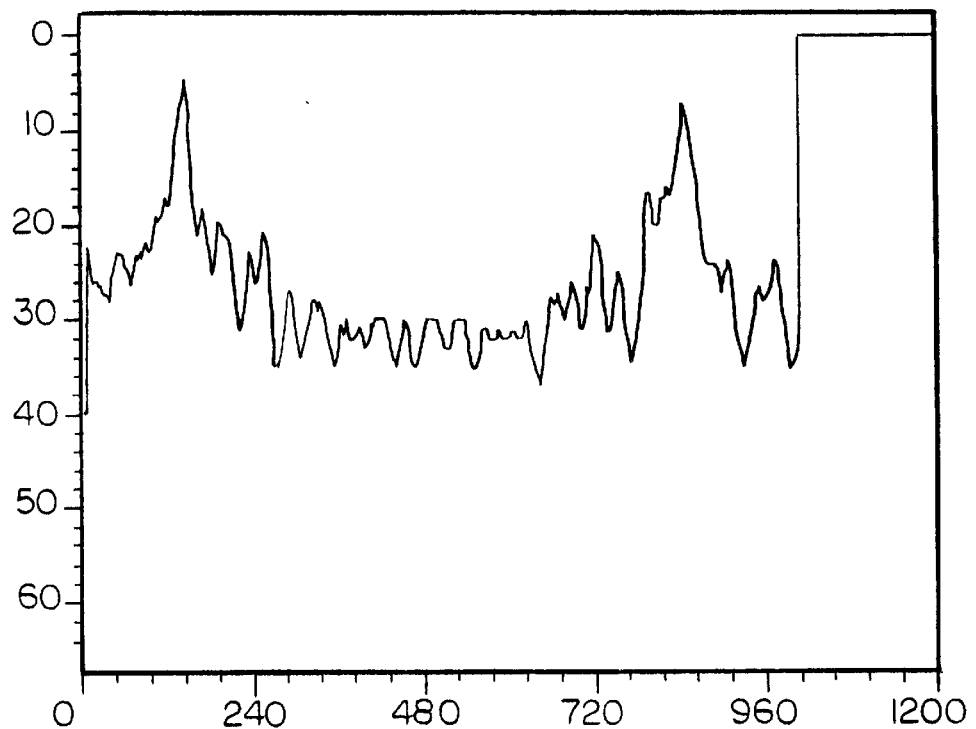
Figure 28:
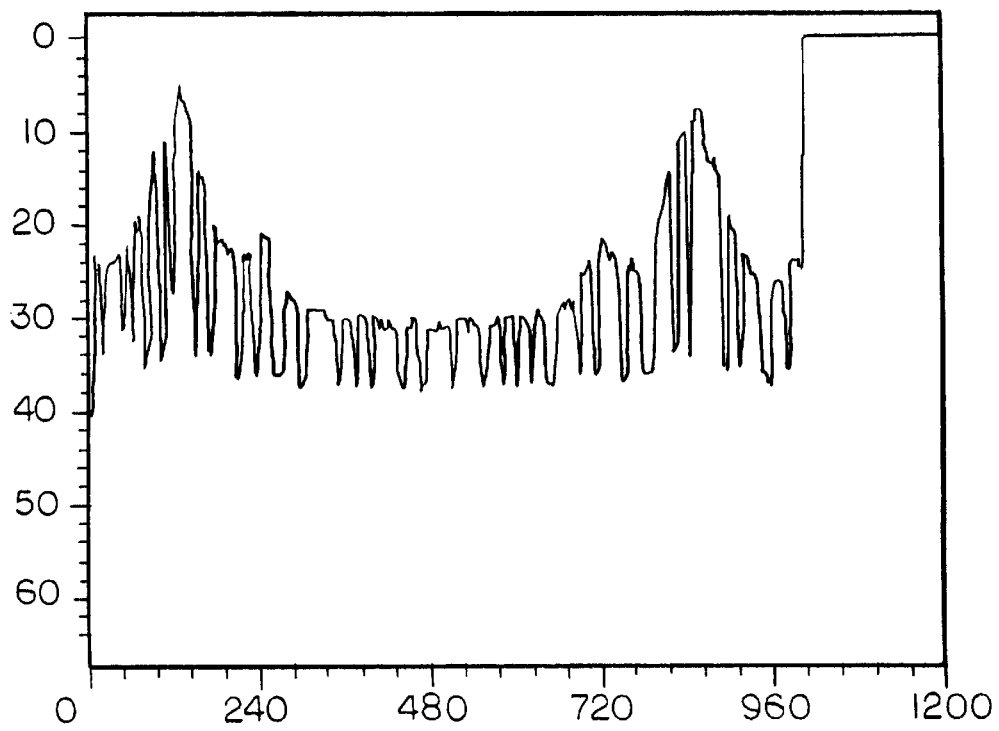
Figure 29:
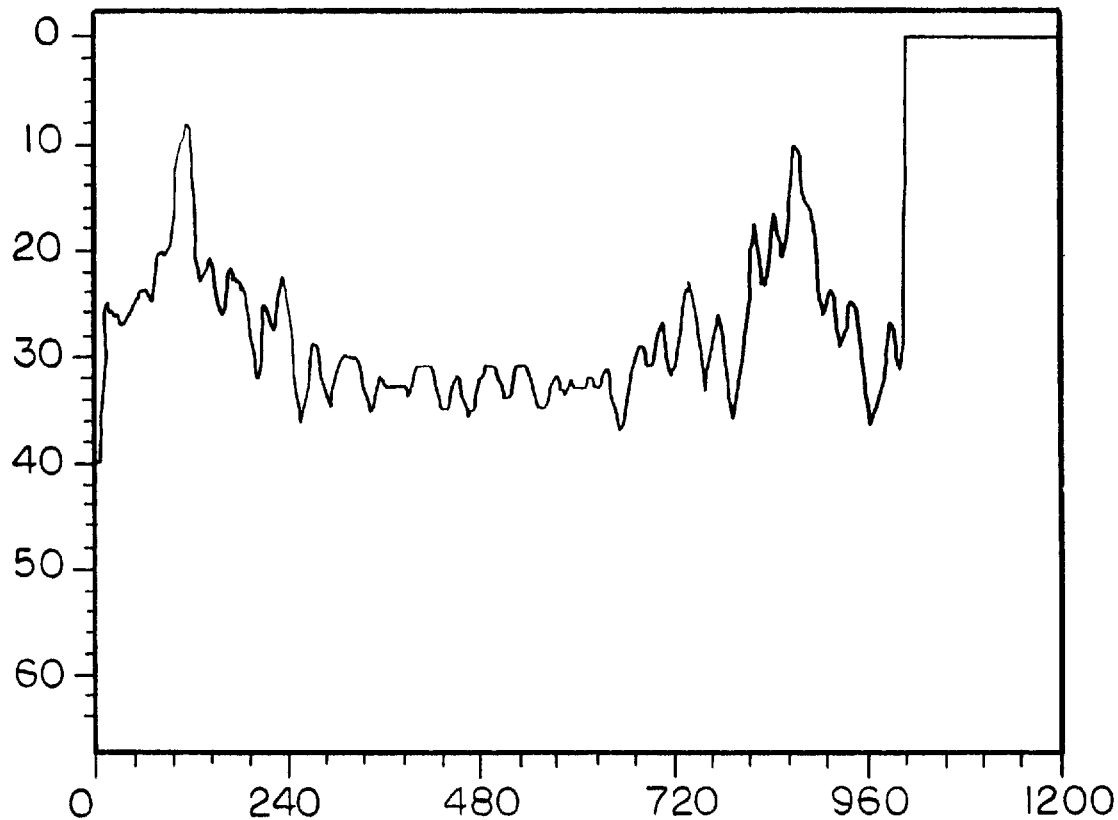
Figure 30:
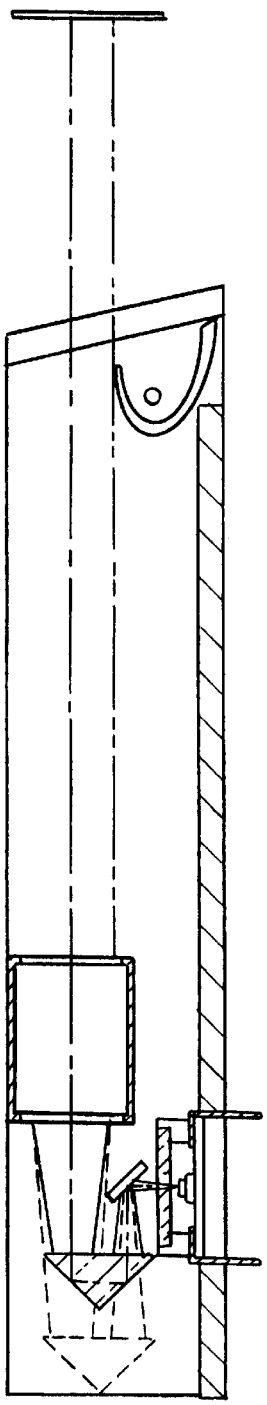
Figure 31:
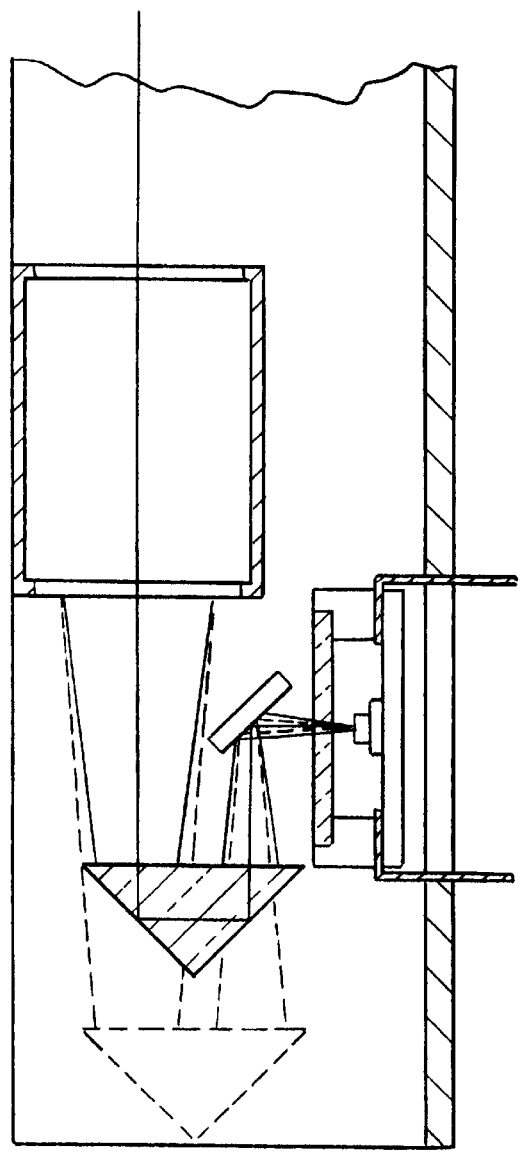
Figure 33:
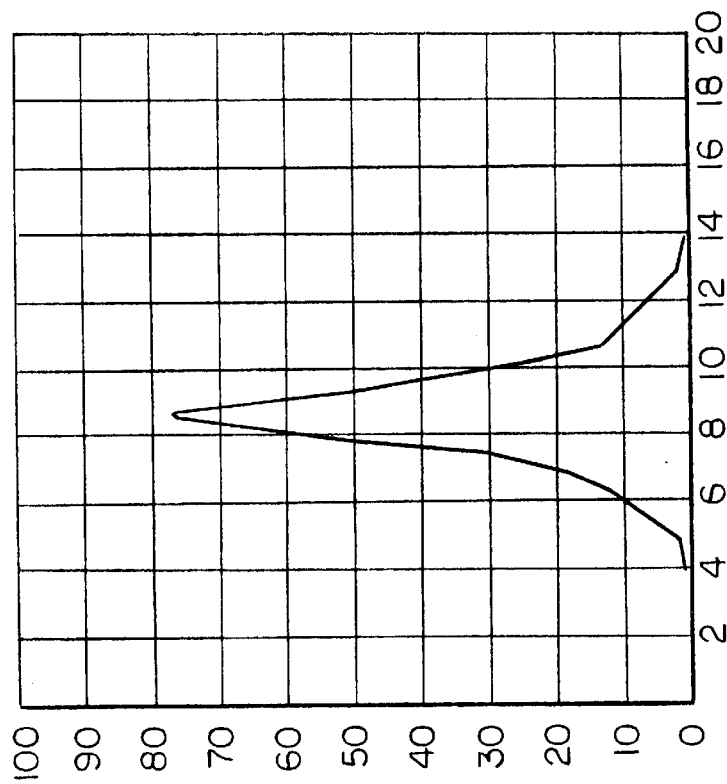
Figure 32:
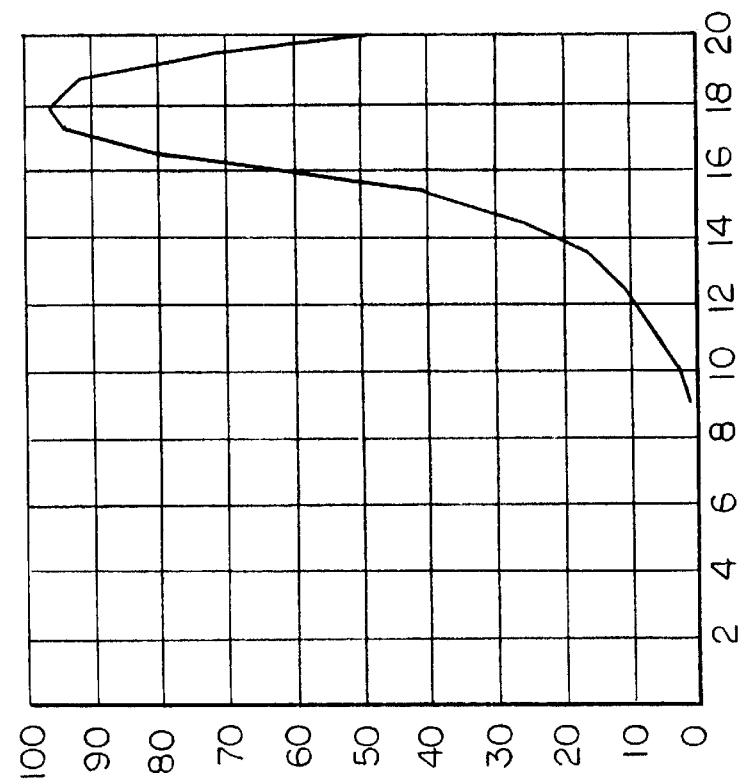
Figure 35:
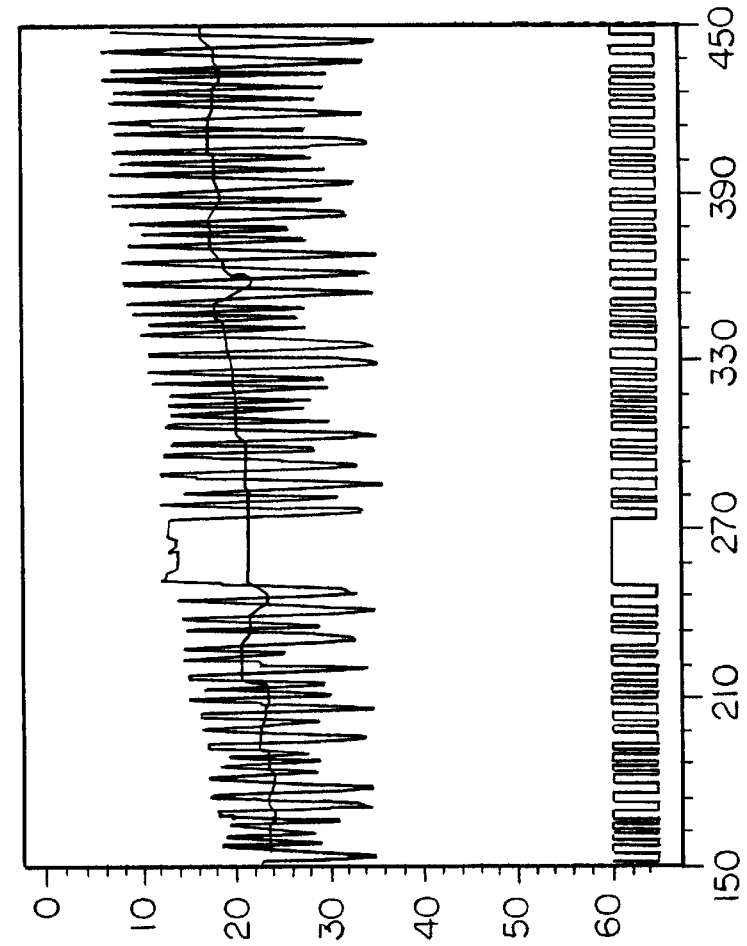
Figure 34:
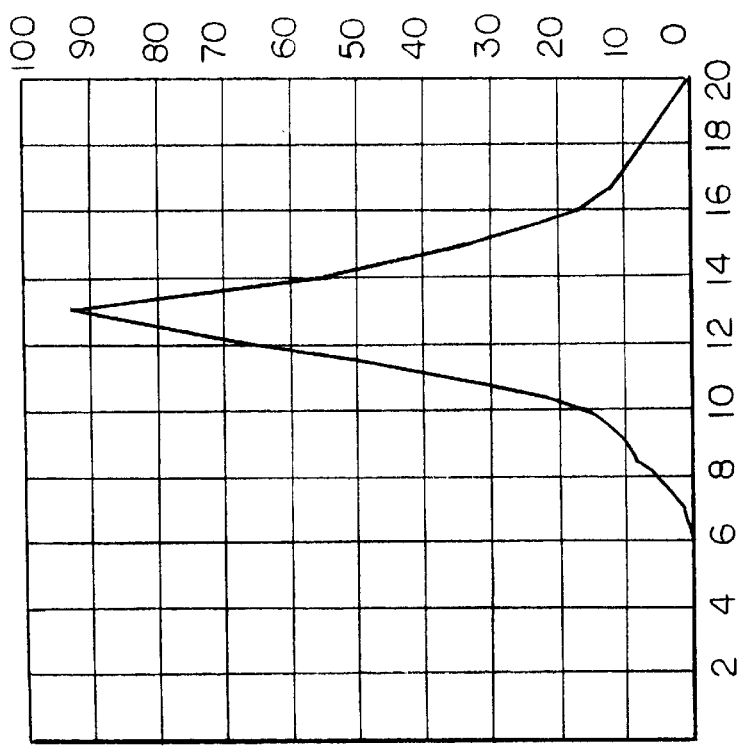
Figure 36:
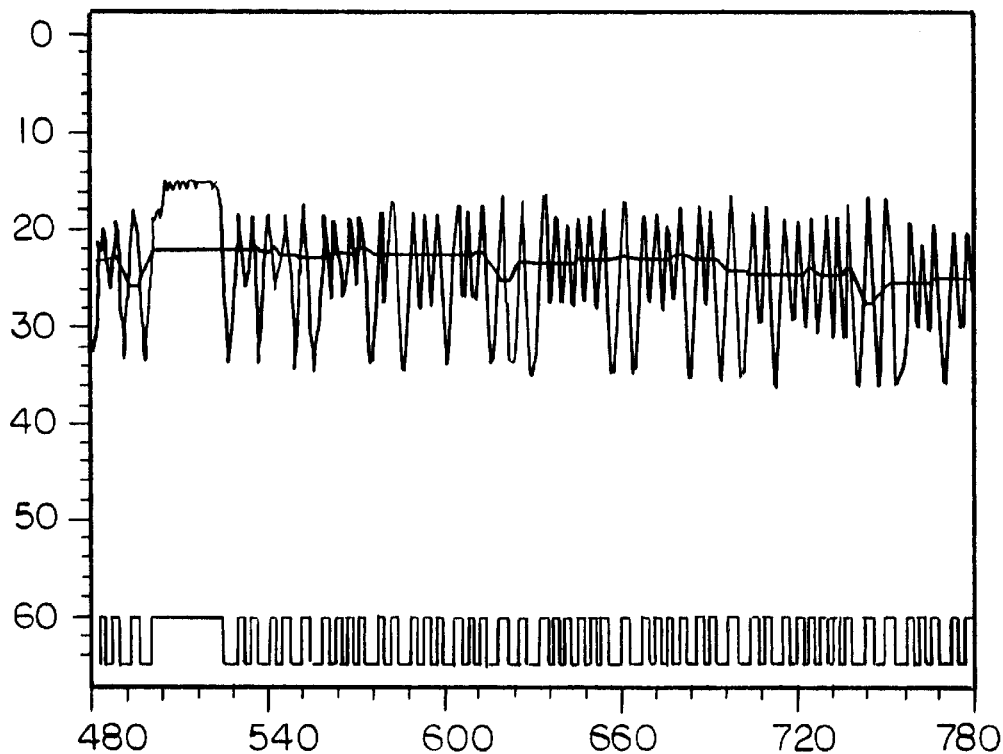
Figure 37:
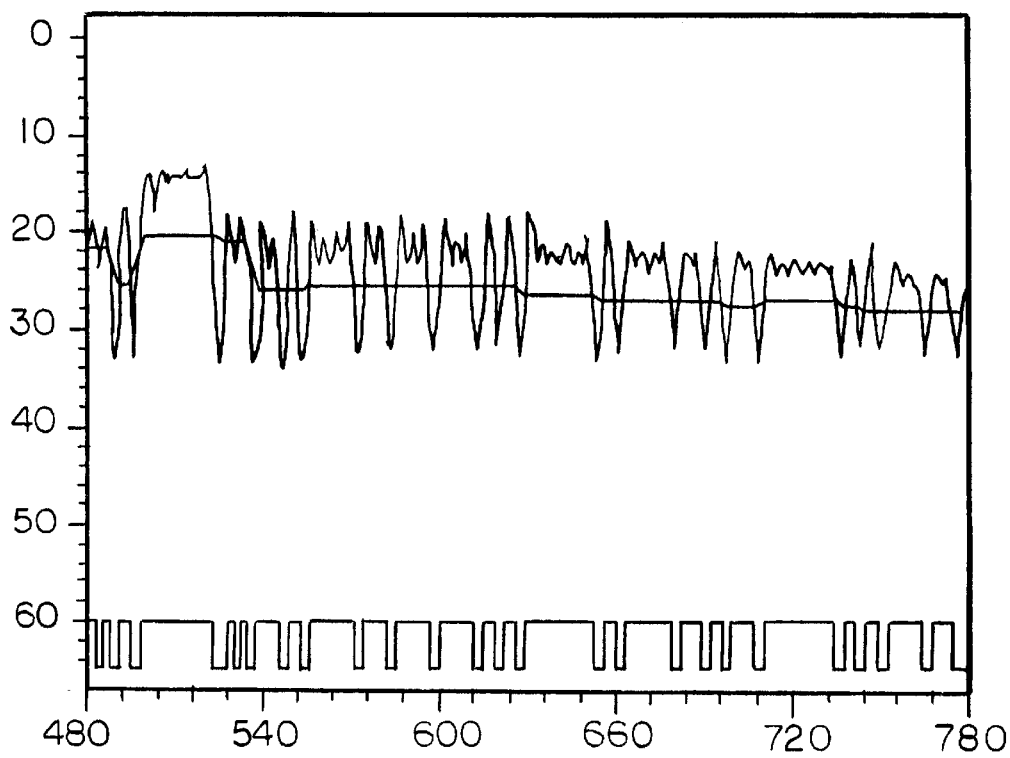
Figure 38:
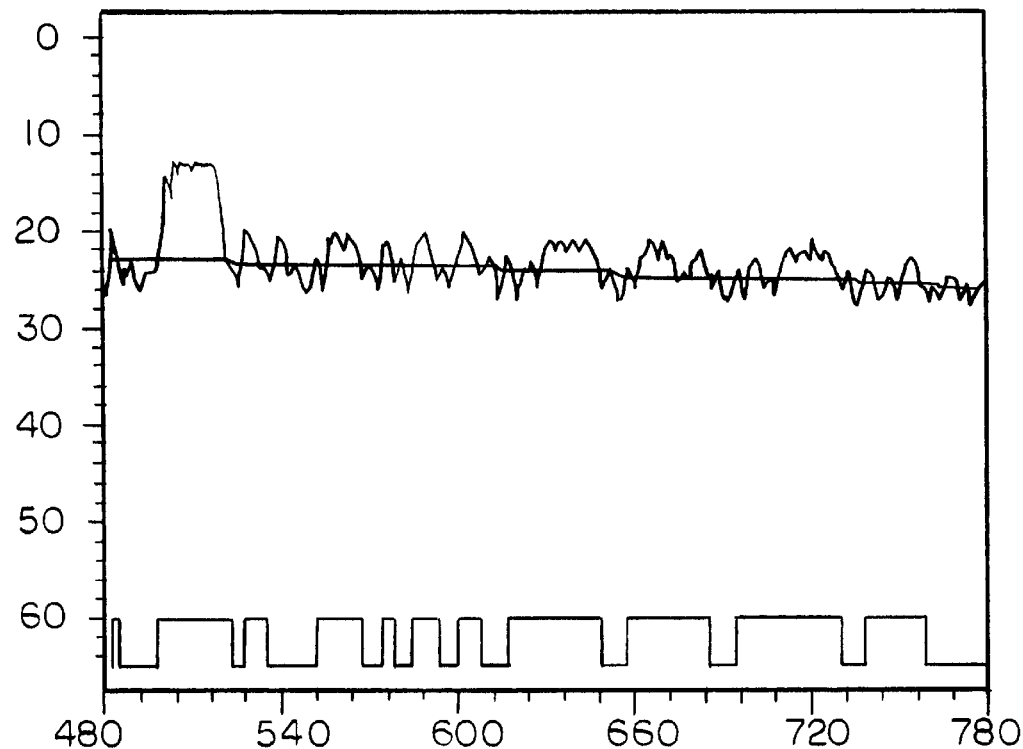
Figure 39:
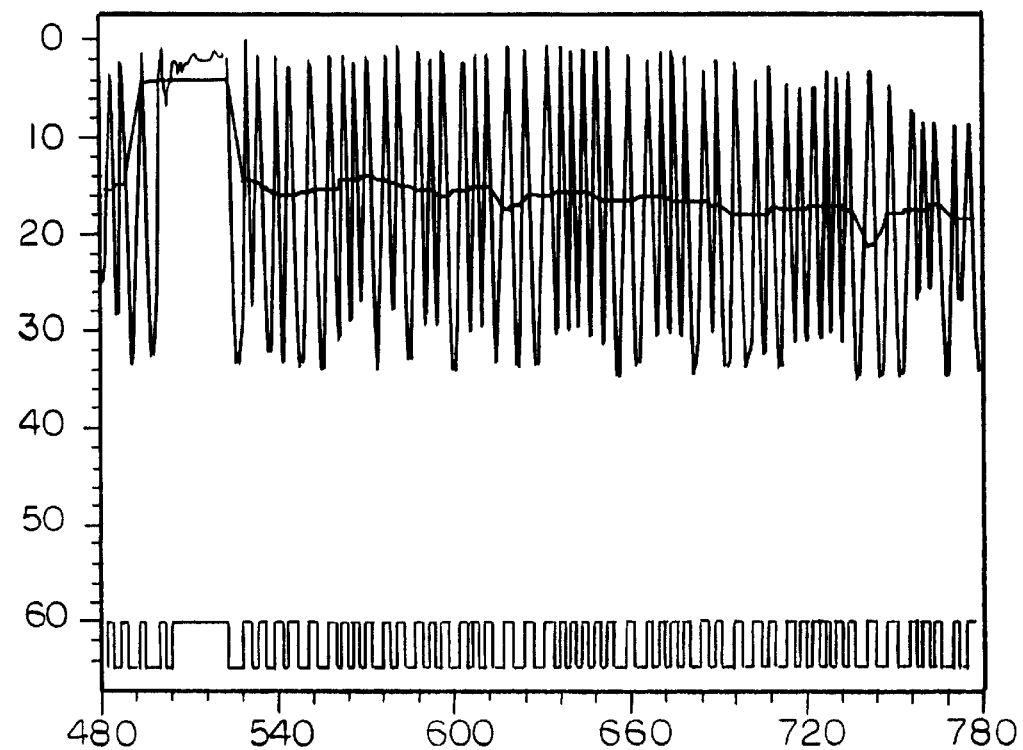
Figure 40:
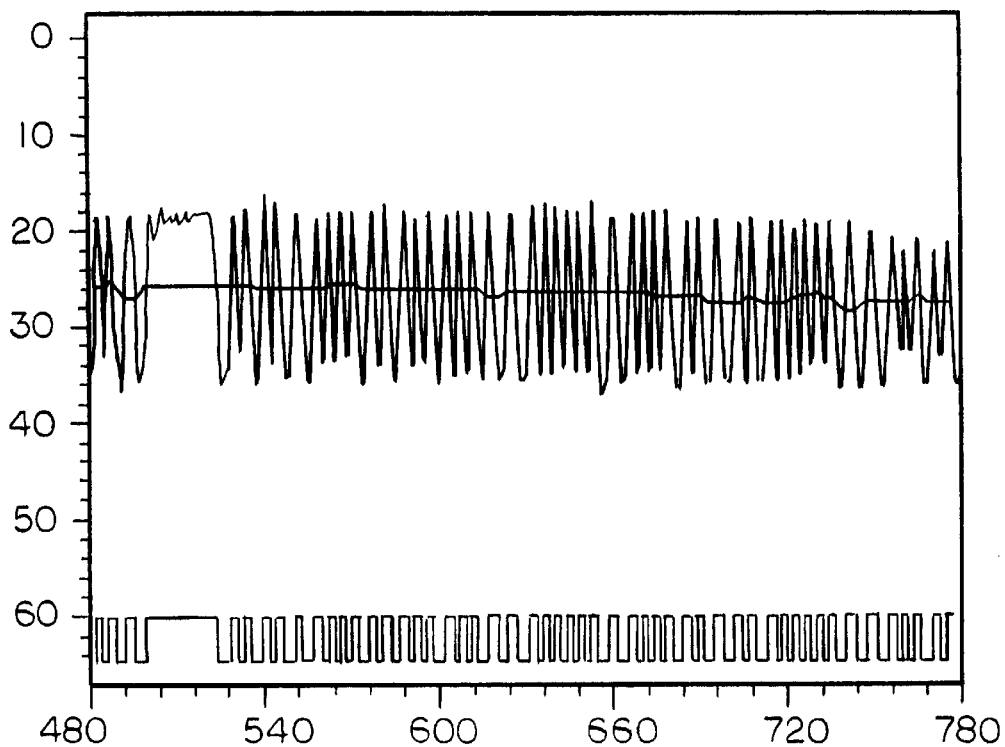
Figure 41:
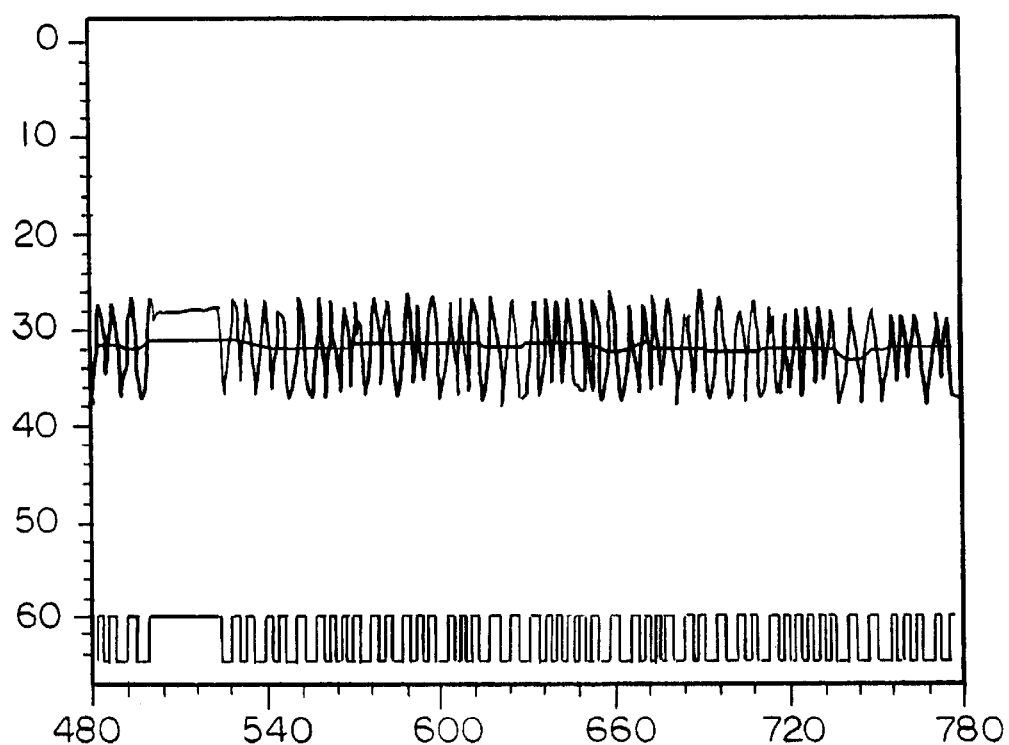
Figure 42:
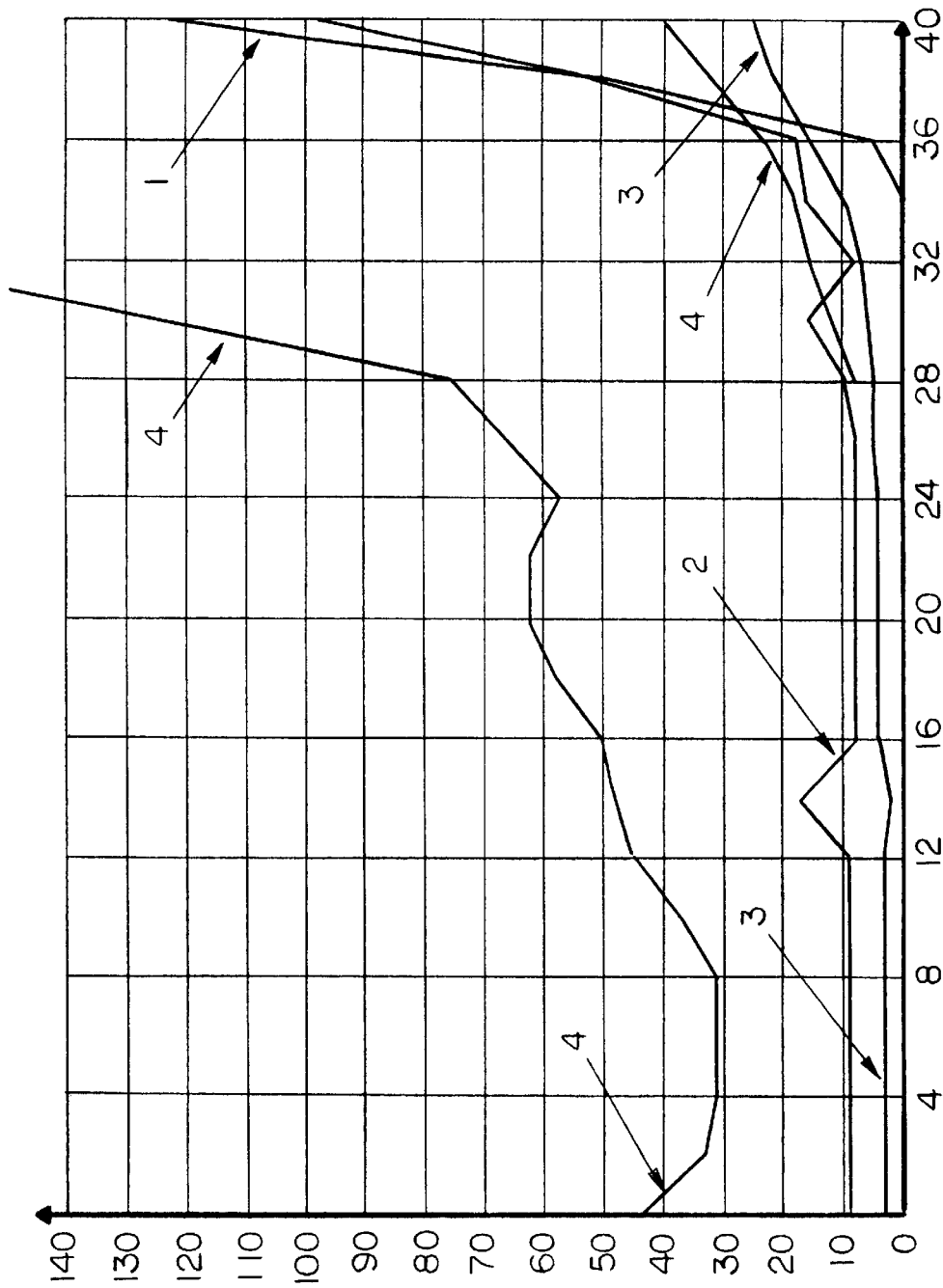
Figure 43:
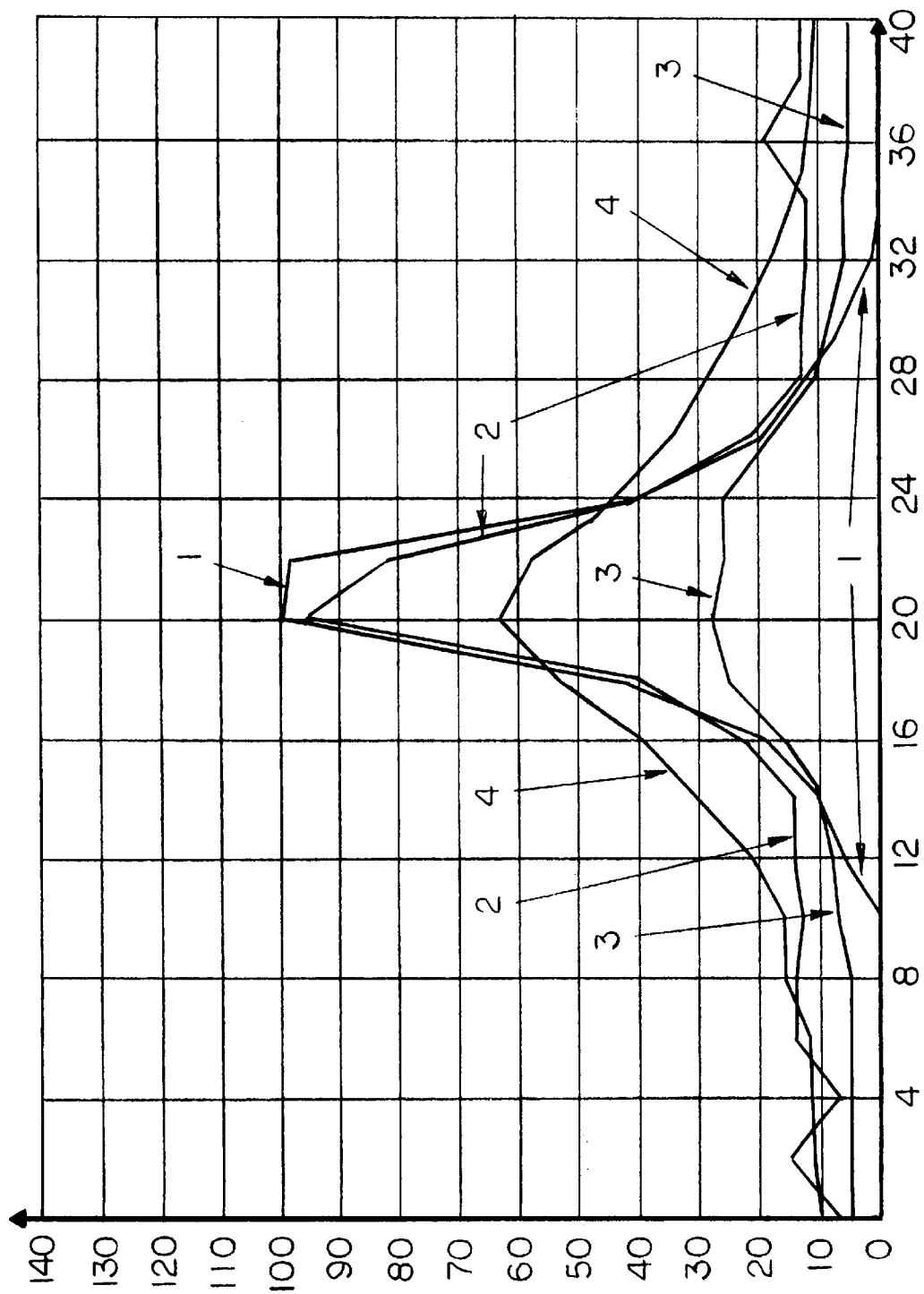
Figure 44:
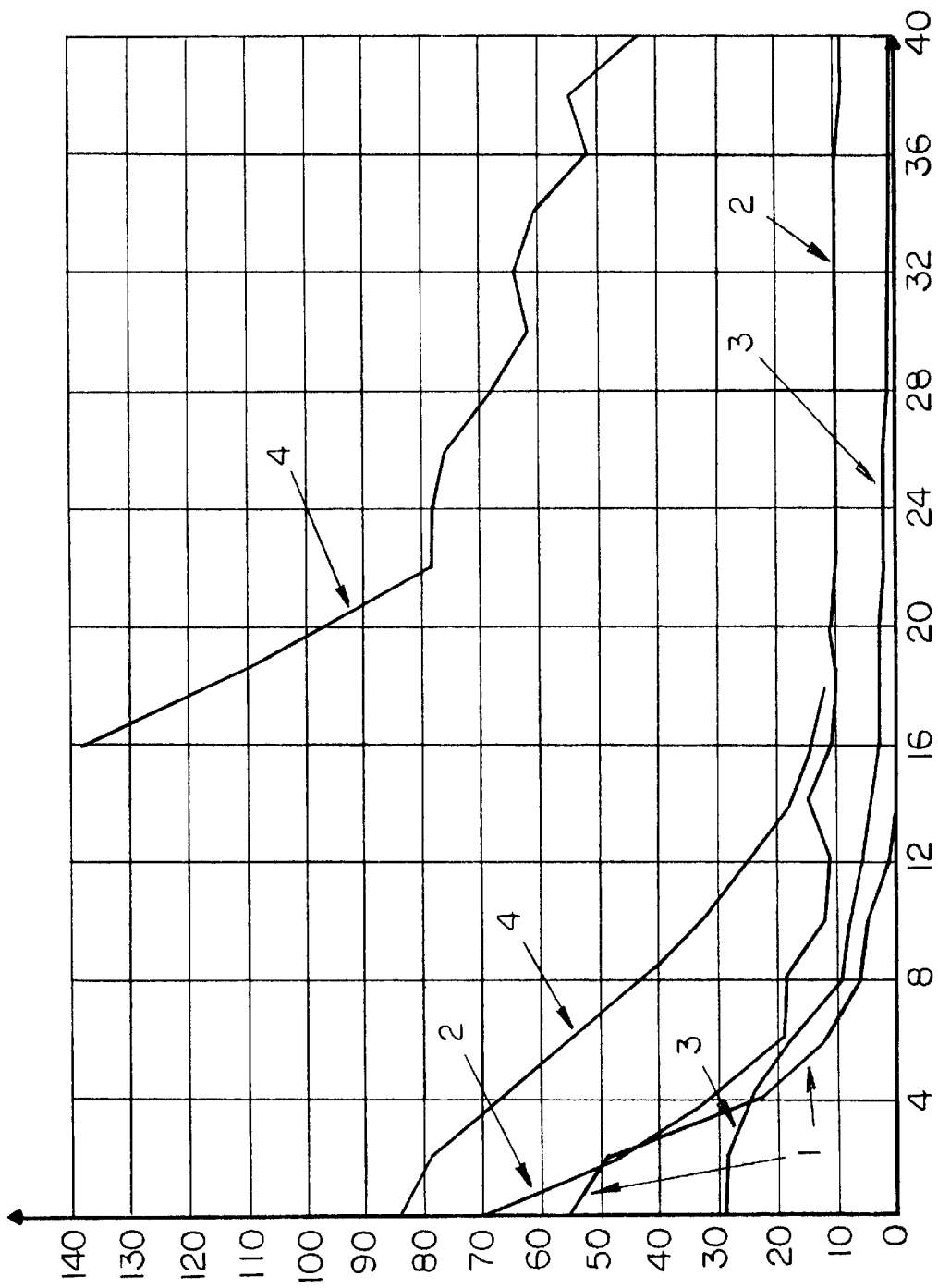
Figure 45:
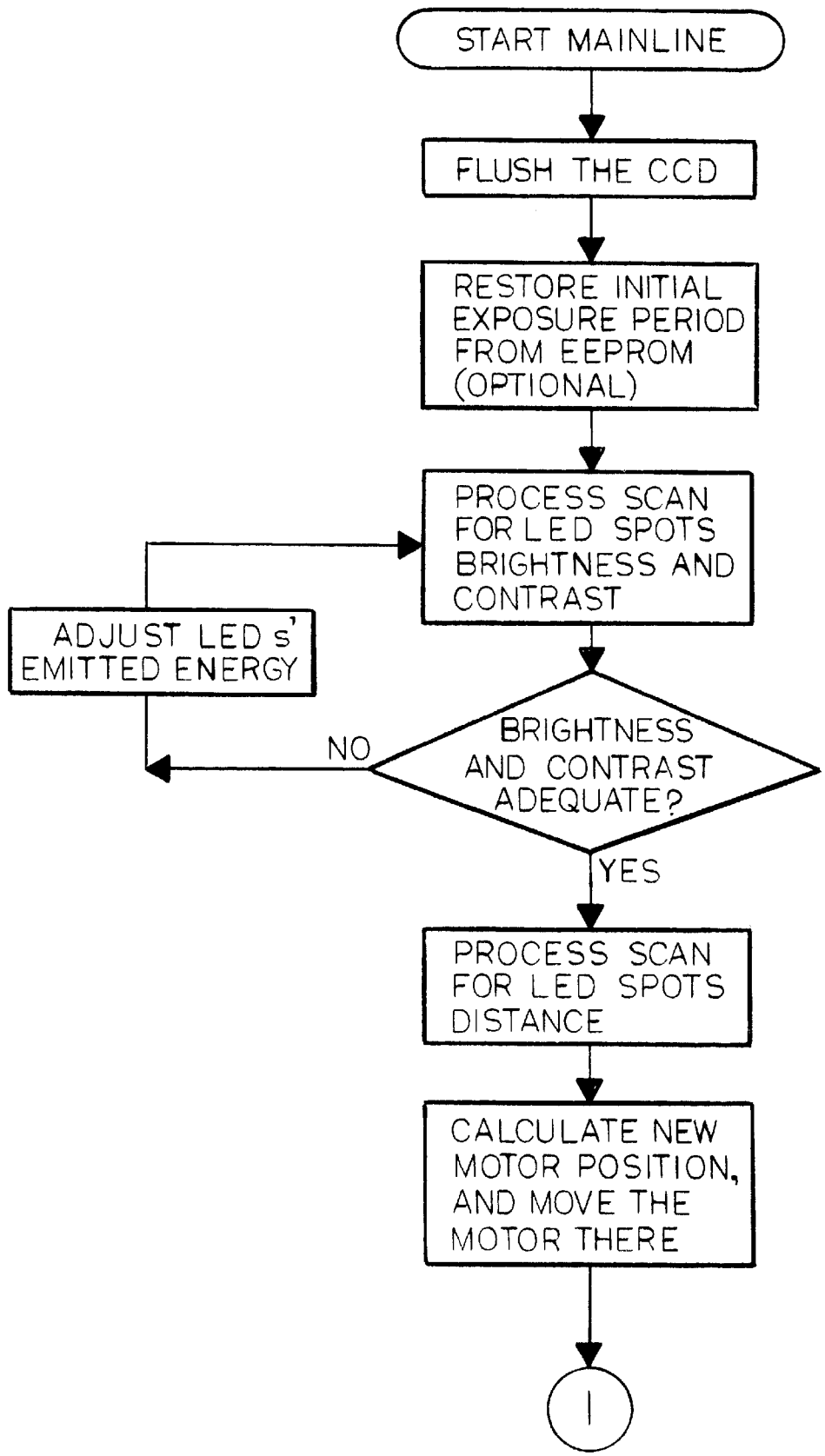
Figure 46:
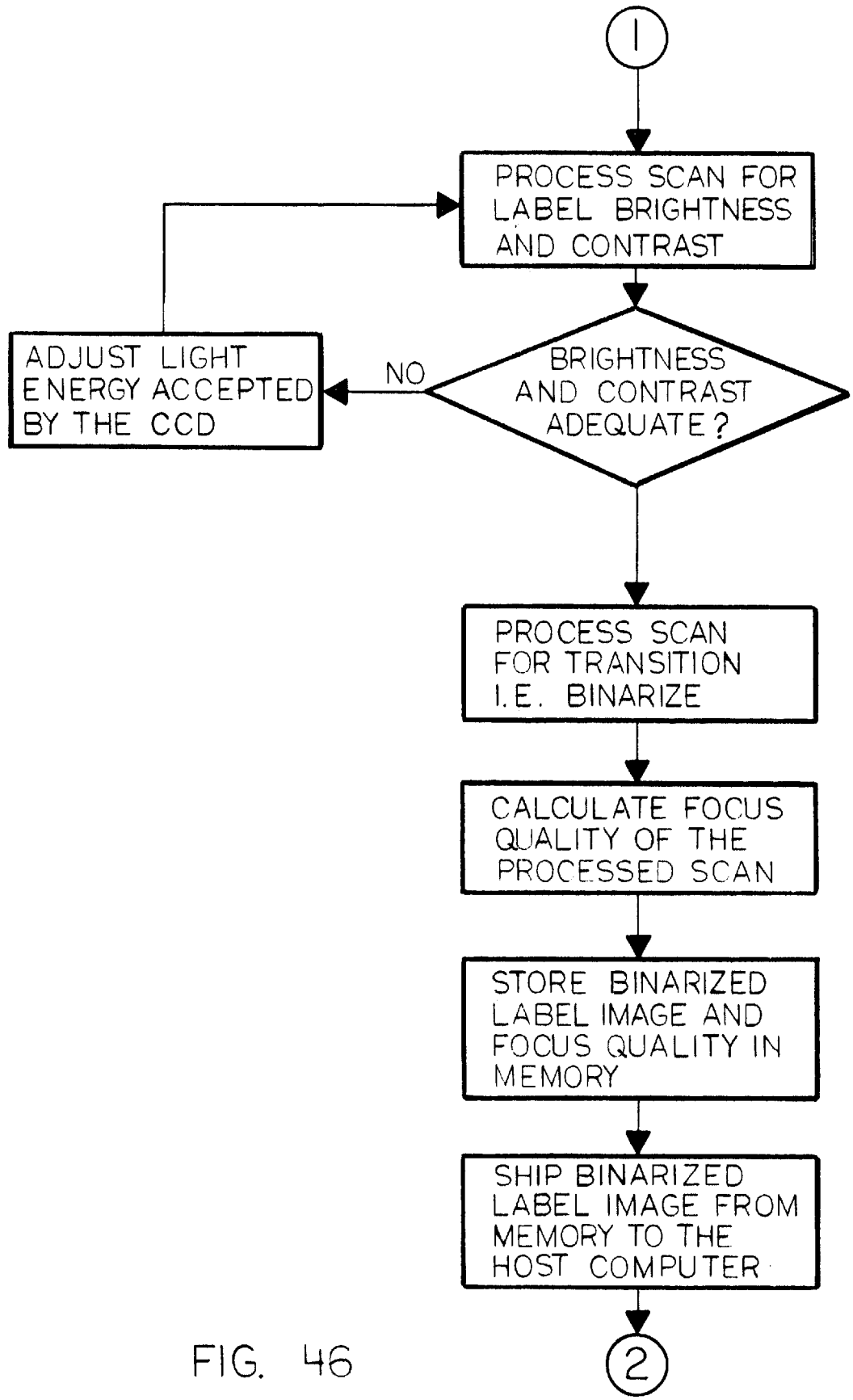
Figure 47:
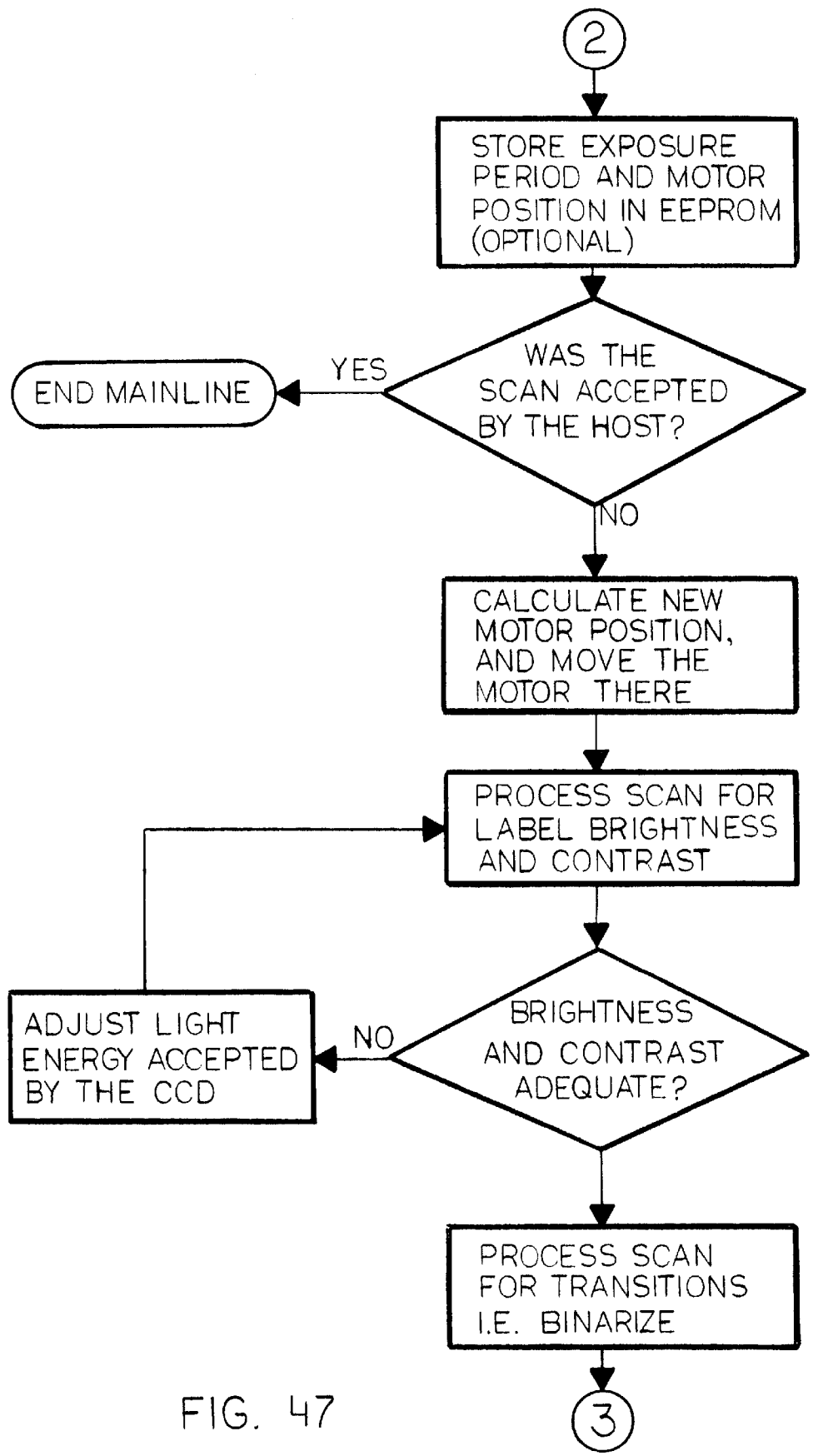
Figure 48:
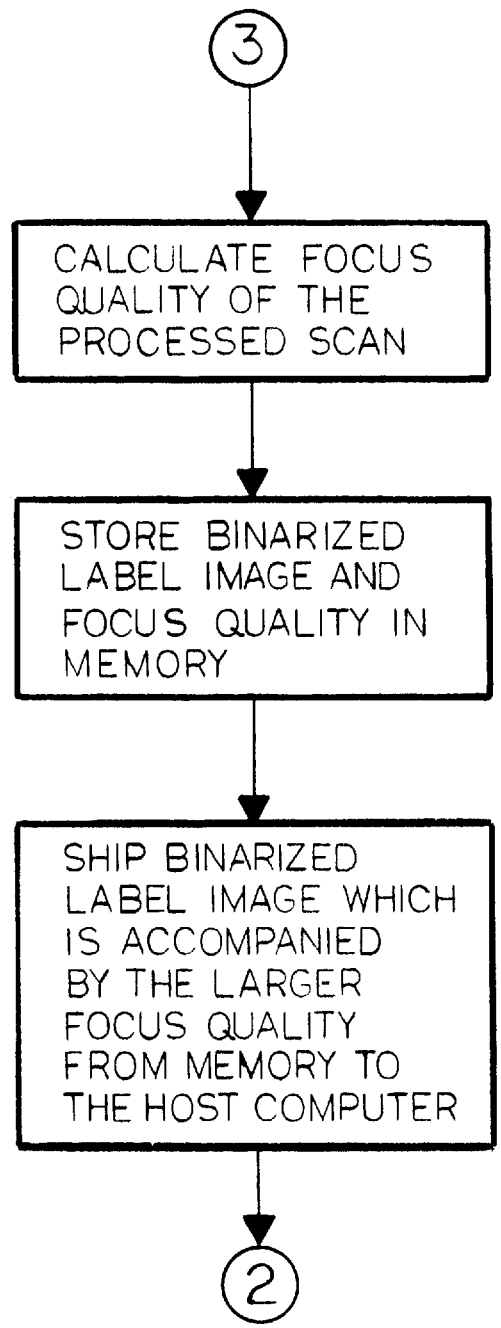

FIG. 12 is a graphical representation illustrating the separation of incident LED spot images on white paper in pixels versus object position in motor steps wherein: line (1) defines this function where the lens position is zero; line (2) defines this function where the lens position is located at 20 motor steps; and line (3) defines this function where the lens position is located at 40 motor steps;

FIG. 13 is a graphical representation of the waveform of the LED spots superimposed on a focused barcode, wherein LED spot centers were located at 285 and 652; FIG. 14 is a graphical half-scale representation of the waveform of FIG. 13 wherein the waveform has been processed;

FIG. 15 is a graphical representation of a focus quality gradient wherein the focus quality of an object located at a position 12 inches from the invention is shown at varying lens positions as determined by (1) a pulse modulation algorithm, (2) a maximum slew rate algorithm, and (3) a maximum slew rate algorithm wherein the signal of every 10 pixels is averaged;

FIG. 16 is a graphical representation of a focus quality gradient utilizing a pulse modulation algorithm wherein the lens was focused at 9 inches, 13 inches, and 20 inches respectively;

FIG. 17 is a is a graphical representation of a focus quality gradient wherein the focus quality of an object located at a position 20 inches from the invention is shown at varying lens positions as determined by (1) a pulse modulation algorithm, (2) a maximum slew rate algorithm, and (3) a maximum slew rate algorithm wherein the signal of every 10 pixels is averaged;

FIG. 18 is a graphical representation of a focus quality gradient wherein the focus quality of an object located at a position 2 inches from the invention is shown at varying lens positions as determined by (1) a pulse modulation algorithm, (2) a maximum slew rate algorithm, (3) a maximum slew rate algorithm wherein the signal of every 10 pixels is averaged, and (4) a relative length of curve algorithm;

FIG. 19 is a graphical representation of a focus quality gradient wherein the focus quality of an object located at a position 4 inches from the invention is shown at varying lens positions as determined by (1) a pulse modulation algorithm, (2) a maximum slew rate algorithm, and (3) a maximum slew rate algorithm wherein the signal of every 10 pixels is averaged;

FIG. 20 is a graphical representation illustrating the separation of incident LED spot images on a bar code label in pixels versus object position in motor steps wherein: line (1) defines this function where the lens position is zero; line (2) defines this function where the lens position is located at 20 motor steps; and line (3) defines this function where the lens position is located at 40 motor steps;

FIG. 21 is a graphical representation of the waveform of two LED spot images superimposed, slightly out of focus, and incident on a dense bar code label wherein the lens was located at 40 steps and the label was located at 38 steps (illuminations was high with peaks detected at 326, 576);

FIG. 22 is a graphical representation of the waveform of two LED spot images superimposed, out of focus, and incident on a dense bar code label wherein the lens was located at 40 steps and the label was located at 30 steps (illuminations was high with peaks detected at 271, 644);

FIG. 23 is a graphical representation of the waveform of two LED spot images superimposed, in focus, and incident on a dense bar code label wherein the lens was located at 30 steps and the label was located at 30 steps (illuminations was high with peaks detected at 288, 646);

FIG. 24 is the processed scan illustrated by FIG. 23 showing the uneven illumination of the bar code label;

FIG. 25 is a graphical representation of the waveform of two LED spot images superimposed, out of focus, and incident on a dense bar code label wherein the lens was located at 30 steps and the label was located at 20 steps (peaks detected at 198, 723);

FIG. 26 is a graphical representation of the waveform of two LED spot images superimposed, in focus, and incident on a dense bar code label wherein the lens was located at 20 steps and the label was located at 20 steps (peaks detected at 195, 738);

FIG. 27 is a graphical representation of the waveform of two LED spot images superimposed, out of focus, and incident on a dense bar code label wherein the lens was located at 20 steps and the label was located at 10 steps (peaks detected at 114, 813);

FIG. 28 is a graphical representation of the waveform of two LED spot images superimposed, in focus, and incident on a dense bar code label wherein the lens was located at 10 steps and the label was located at 10 steps (peaks detected at 107, 831);

FIG. 29 is a graphical representation of the waveform of two LED spot images superimposed, out of focus, and incident on a dense bar code label wherein the lens was located at 0 steps and the label was located at 10 steps (peaks detected at 84, 843);

FIGS. 30 and 31 are side elevational views of a preferred optical system utilizing a moveable prism;

FIGS. 32, 33, and 34 are graphical representations of focus quality gradients prepared using a pulse modulation algorithm wherein the lens was focused at 18 inches, 9 inches, and 13 inches respectively;

FIGS. 35, 36, 37, and 38 are graphical representations of the waveform of a reflected light image of a bar code label wherein illumination was constant and focus quality was changed;

FIG. 39, 40, and 41 are graphical representations of the waveform of a reflected light image of a bar code label wherein focus quality was constant and illumination was changed;

FIG. 42 is a graphical representation of a focus quality gradient wherein the focus quality of an object located at a position 20 inches from the invention is shown at varying lens positions as determined by (1) a pulse modulation algorithm, (2) a maximum slew rate algorithm, (3) a maximum slew rate algorithm wherein the signal of every 10 pixels is averaged, and (4) a relative length of curve algorithm;

FIG. 43 is a graphical representation of a focus quality gradient wherein the focus quality of an object located at a position 5 inches from the invention is shown at varying lens positions as determined by (1) a pulse modulation algorithm, (2) a maximum slew rate algorithm, (3) a maximum slew rate algorithm wherein the signal of every 10 pixels is averaged, and (4) a relative length of curve algorithm; and FIG. 44 is a graphical representation of a focus quality gradient wherein the focus quality of an object located at a position 2 inches from the invention is shown at varying lens positions as determined by (1) a pulse modulation algorithm, (2) a maximum slew rate algorithm, (3) a maximum slew rate algorithm wherein the signal of every 10 pixels is averaged, and (4) a relative length of curve algorithm.

FIGS. 45–48 depict a flow diagram of an exemplary instruction set to be used by the microprocessor to carry out the processes of an exemplary embodiment of the present invention.

While the invention will be described with a preferred embodiment, it will be understood that it is not intended to limit the invention to that embodiment. On the contrary, it is intended to cover all alternatives, modifications and equivalents as may be included within the spirit and scope of the invention as defined by the appended claims.

BEST MODE FOR CARRYING OUT THE INVENTION

Figure 1:
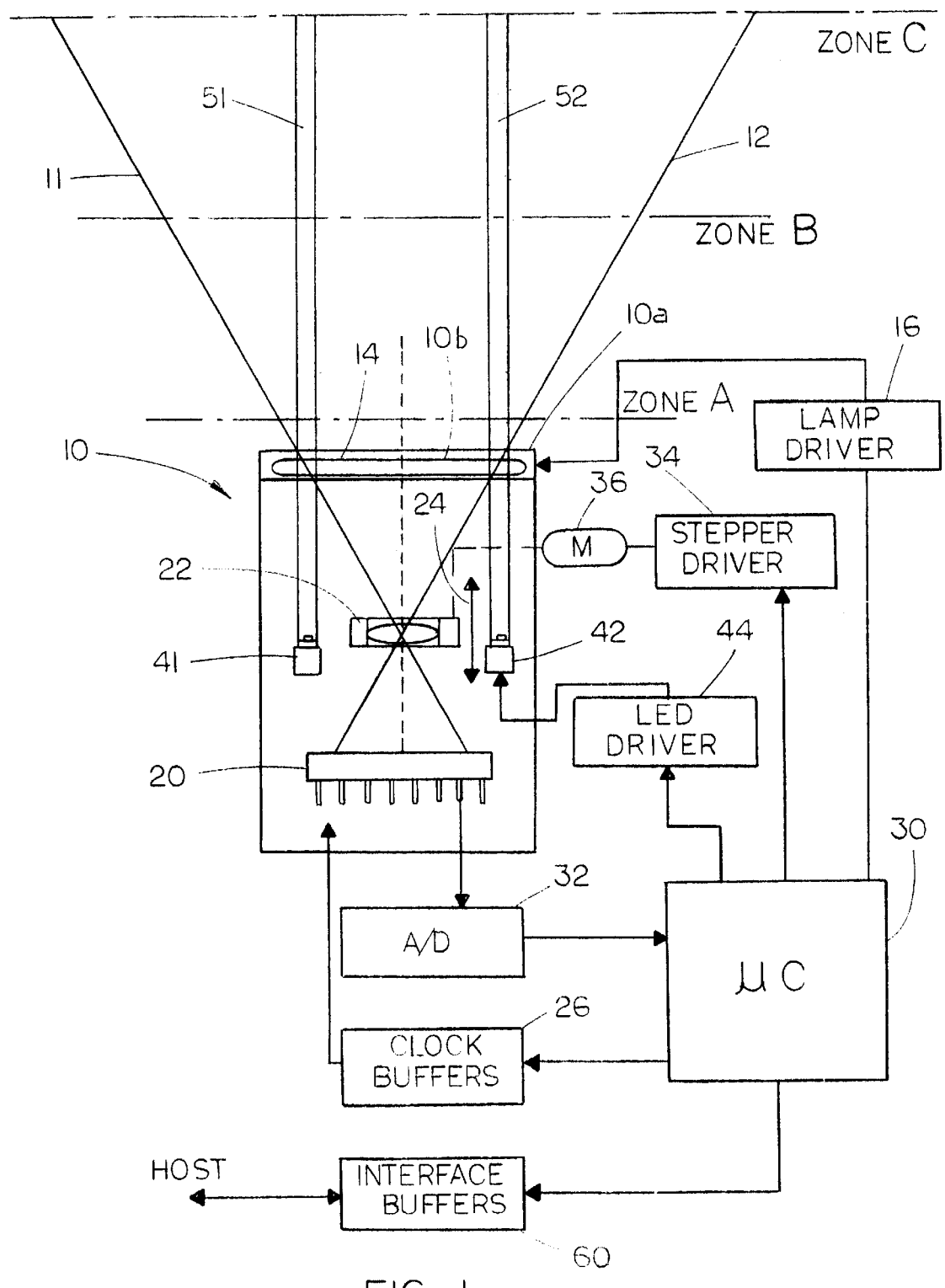

FIG. 1 is a diagrammatic illustration of a presently preferred embodiment of the instant invention. While the reading system of FIG. 1 could be contained within a housing such as indicated in the third figure of U.S. Pat. No. 4,877,949, and as described in detail in U.S. Pat. No. 4,570,057, it is highly advantageous to be able to house the reader system of FIG. 1 within a compact modular casing such as generally indicated in the thirty-second figure of the international patent application published under the Patent Cooperation Treaty as International Publication No. WO90/16033 with a publication date of Dec. 27, 1990. Where an RF module as shown in the thirty-sixth figure of WO90/16033 might have a depth of about three centimeters, a width of about seven centimeters, and a length of about eight centimeters (exclusive of RF antenna), a combined RF and bar code reader module utilizing the reader system of FIG. 1 might have the same length and width, and a depth of about six centimeters, or less. The reader system of FIG. 1 including associated electronics would thus, preferably, occupy a volume of less than 168 cubic centimeters. Rectangle 10 in FIG. 1 may represent a module casing having a length of about eight centimeters, a width of about seven centimeters, and a depth of about six centimeters, constructed to interchangeably engage with a base housing such as utilized with the RT 1000 radio data terminal of Norand Corporation, and containing an RF transceiver in addition to the reader system of FIG. 1.

As diagrammatically indicated in FIG. 1, the module casing 10 may have a frontal end 10a with a light transmissive window 10b accommodating marginal light rays, such as 11, 12. In the event ambient light alone is insufficient to obtain a valid reading, an elongated light source 14 may be electrically energized from a lamp driver 16 to illuminate the region bounded by marginal rays 11, 12. For the case of a bar code, the maximum length of bar codes which may be read depends on the distance of the bar code carrier from the reader frontal end. At a minimum distance, a bar code of a length corresponding to the width of the light transmissive window (60 mm) may be successfully read, while at a distance of 1.5 inches, the bar code may have a length of ninety millimeters, and at a distance of three inches, the bar code may have a length of one hundred thirty millimeters.

Bar codes occupying locations within the field defined by marginal rays 11, 12, and lying between zones A and C in FIG. 1, may be focused onto a reading sensor 20 by adjustment of an optical system diagrammatically indicated at 22 and as represented by double headed arrow 24.

In the illustrated embodiment, it is contemplated that the reading sensor 20 (e.g., a CCD type image sensor with a length of about thirty millimeters and between 2,000 and 5,000 elements), may be driven via clock buffers 26 from a microprocessor 30, and that each pixel value in the output from the sensor 20 may be converted to digital form (e.g., a binary number) with a gray scale range of substantial extent for processing, either by a high speed external analog to digital converter 32, or by comparable on-chip means associated with microprocessor 30. The microprocessor is indicated as controlling focus via a stepper driver 34 and stepper motor 36.

Visible light beam generators 41, 42 are indicated as being electrically energized under the control of microprocessor 30 via a driver 44. The beams 51, 52 from beam generators 41, 42 preferably produce sharply defined spots on a bar code carrier within the operating range of the lens system.

When the reader system is activated e.g., by manually operating a trigger button such as indicated in WO90/16033 (e.g., at 651 in the thirty-second figure), the microprocessor may flash the beam generators 41, 42 to generate beams 51, 52. These beams assist the user in aiming the reader toward a bar code. Further, when the beams 51, 52 are directed so as to impinge on a bar code carrier, the reflected light from the beams will in part follow a path through the light transmissive window 10b at frontal end 10a, and via optics system 22 to impinge on reading sensor 20. Even though the reflected beams may not be sharply focused on the reading sensor 20, it is conceived that the reading sensor may be utilized to supply the output generated by the reflected beams (with light source 14 inactive) and that such output may be processed by the microprocessor 30 to obtain an indication of the direction and amount to move the lens system to improve focus.

Furthermore, as focus improves, a further flashing of beams 51, 52 may result in a more accurate measure of the positions at which the reflected beams impinge on the reading sensor. In this way, the microprocessor may quickly determine the distance to move lens system 22 so as to bring the bar code within the depth of field range of the lens system.

Experimental Work Regarding FIG. 1

Figure 2A:
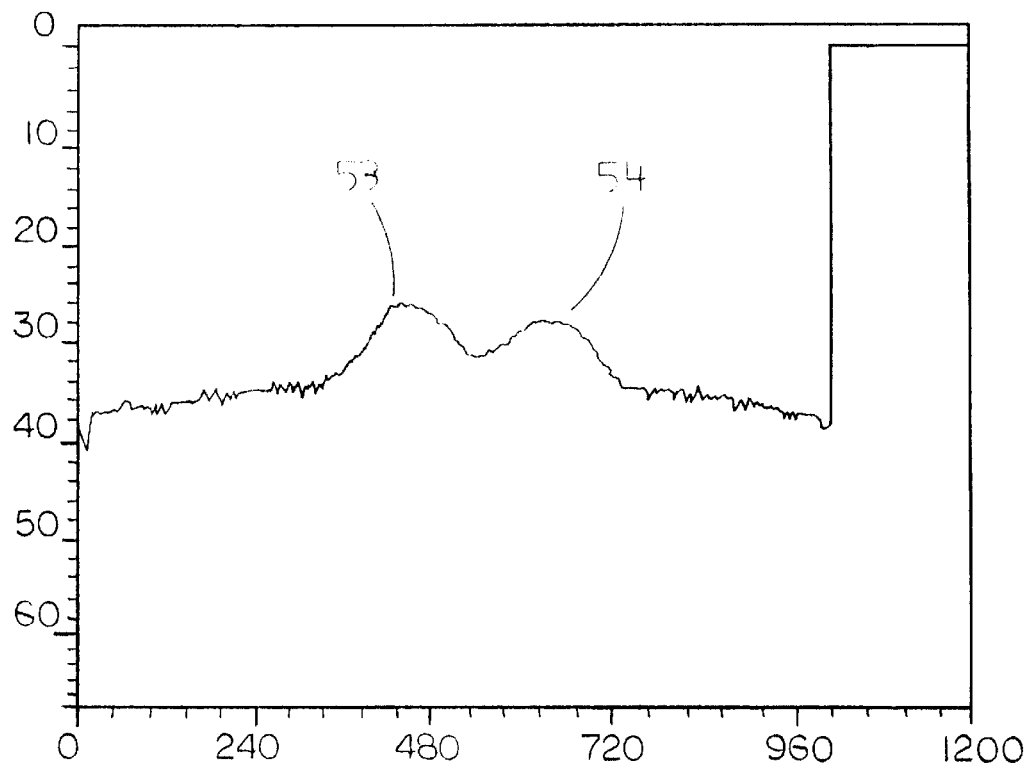
Figure 2B:
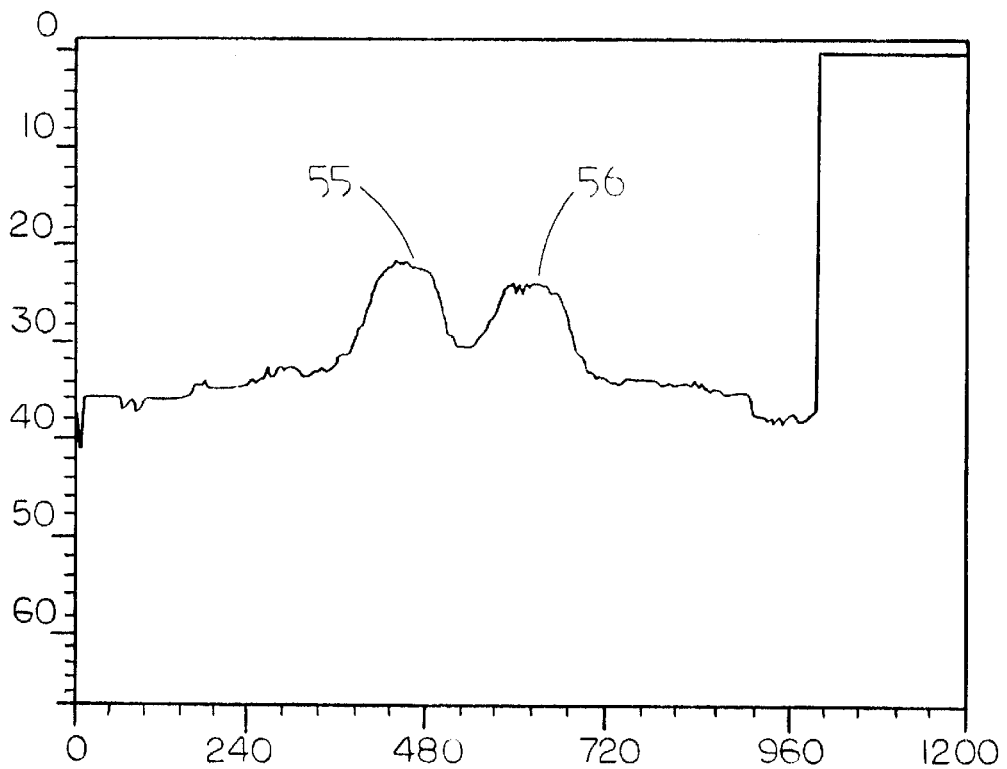
Figure 2C:
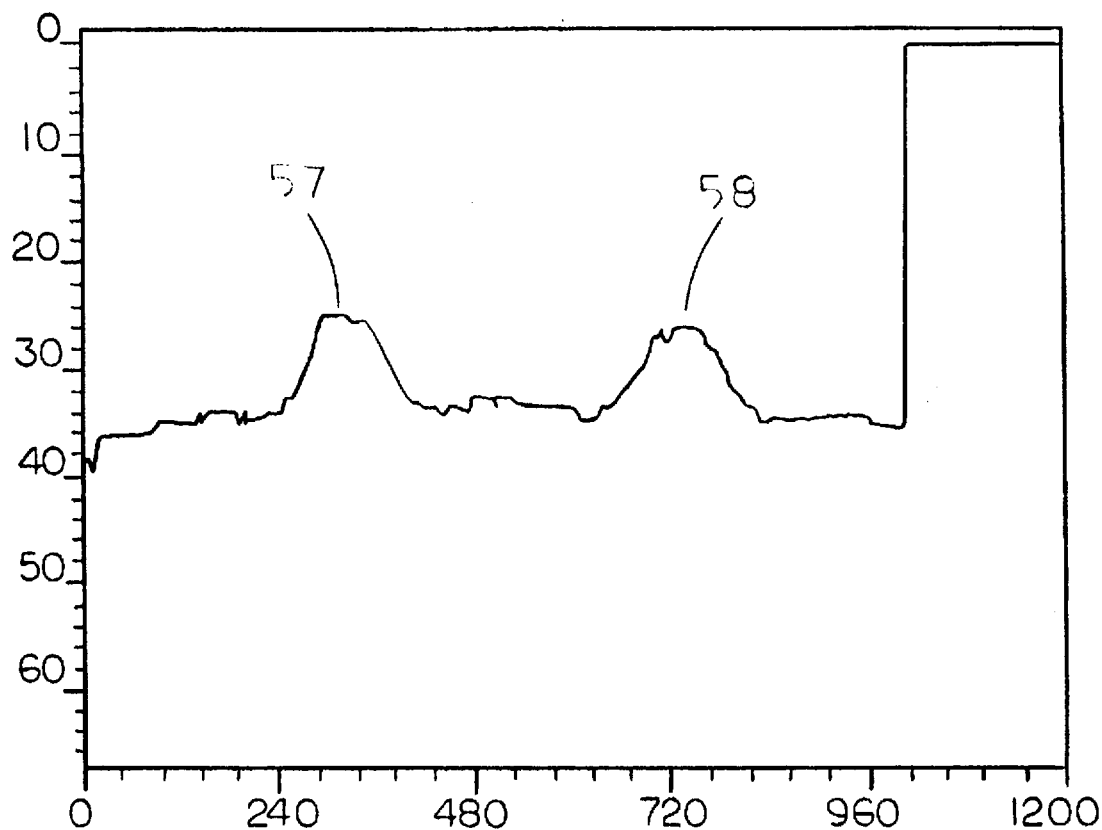

In testing the conception of the use of marker beams 51, 52 for obtaining a distance indication, an optical system was used having an F-number for infinity of four and requiring a change in the optical path distance from the lens to the sensor of about fourteen millimeters (14 mm). Such a system was determined to be capable of focusing over distances from lens to an object between nil and 578 millimeters (578 mm). Beam sources corresponding to sources 41, 42 were light emitting diodes that created light spots at a distance of twenty inches which were about one inch square. At close up distances between zero and one inch, such light spots were about one-quarter (¼) inch square. Even with such light emitting diodes, it was found that distance measurements were feasible based on outputs from the CCD sensor such as represented in FIG. 2A. FIGS. 2A, 2B and 2C show waveforms representing the output of a CCD image sensor using the beam sources just described.

The sensor (20) output was digitized by a flash six bit A/D converter (32) and acquired by a personal computer (PC). The PC was programmed to store the image in memory, display the image on a monitor, and then print a graphical representation of the image on paper. These graphs show the images of the spots of light produced by the two pointing beams (51, 52) for various distances to an object. FIG. 2A was taken when the distance was twenty inches and the lens 22 was focused for zero inch object distance. Gradual slopes of the pulses 53, 54 may be seen in FIG. 2A, but pulses due to the beams are clearly identifiable. The distance between the pulse centers is small (about 189 pixels). On the graph of FIG. 2B, there is shown an image of the same spots at the same object distance of twenty inches, but the lens is now focused also at twenty inches. The slopes of the pulses 55, 56 are sharper. The distance between centers is a bit smaller (about 170 pixels) due to an increased reduction coefficient, (i.e., the distance between the lens and sensor was reduced during focusing). For accurate range measurements a correction measure, in order to compensate for this effect, must be performed by a microcomputer.

FIG. 2C shows the image of the spots 57, 58 when the object is positioned at a five inch distance and the lens 22 is focused for zero inch object position. In this configuration the distance between the spots is about 416 pixels indicating a smaller distance to the target.

It may be noted that a light emitting diode with a special lens could be used for the beam source to provide a much more sharply collimated beam. Further of course, solid state laser diode sources could provide beams which would produce spots of one to two millimeters diameter at twenty inches. Based on the experimental results, it is concluded that such more expensive beam sources should not be necessary for the purposes of a low cost embodiment according to FIG. 1.

Description of TABLES I and II, FIGS. 3A, 3B, 3C, 4A and 4B

In explaining an exemplary mode of operation, it is useful to refer to the TABLES I and II on the following pages:

| pixel size: | 14 microns | 11 microns | 8 microns |
|---|---|---|---|
| D | b | pixels per narrow bar; 0 deg pitch | | |
| 1.5 | 4 | 2.3 | 2.9 | 4 |
| 3.0 | 5 | 1.96 | 2.5 | 3.42 |
| 6.0 | 7.5 | 1.8 | 2.29 | 3.15 |
| 15.0 | 20 | 2.2 | 2.82 | 3.88 |
| 20.0 | 40 | 3.42 | 4.35 | 5.98 |
| | | pixels per narrow bar; 55 deg pitch | | |
| | 4 | 1.32 | 1.66 | 2.29 |
| | 5 | 1.12 | 1.43 | 1.96 |
| | 7.5 | 1.03 | 1.32 | 1.81 |
| | 20 | 1.26 | 1.62 | 2.23 |
| | 40 | 1.96 | 2.50 | 3.43 |
| | | pixels per narrow bar; 45 deg pitch | | |
| | 4 | 1.63 | 2.05 | 2.83 |
| | 5 | 1.39 | 1.77 | 2.42 |
| | 7.5 | 1.27 | 1.62 | 2.23 |
| | 20 | 1.56 | 1.99 | 2.74 |
| | 40 | 2.42 | 3.08 | 4.23 |

Summary of Exemplary Mode of Operation for FIG. 1

Assuming that the optical system is initially set for focusing a bar code at Zone C (e.g., D=20 inches in Table I), when the reader trigger is actuated, microprocessor 30 is awakened from a sleep mode by means of a host system via interface buffers 60. At this time, the microprocessor 30 has stored in its memory the focus condition of the lens system

TABLE I

| D (inches) | H (mm) | b (mils)* | K | R (mm) | R (inches) | A (mm) | P14 (mils)* | P11 (mils)* | P8 (mils)* |
|---|---|---|---|---|---|---|---|---|---|
| 0 | 70 | | 1.7 | 51 | (2.0) | 41.2 | .94 | .74 | .54 |
| 1.5 | 108 | 4 | 3.16 | 95 | (3.75) | 34.2 | 1.74 | 1.37 | 1.0 |
| 3.0 | 146 | 5 | 4.62 | 139 | (5.5) | 31.7 | 2.55 | 2.0 | 1.46 |
| 6.0 | 222 | 7.5 | 7.55 | 227 | (9.0) | 29.5 | 4.16 | 3.27 | 2.38 |
| 15 | 451 | 20 | 16.35 | 490 | (19.0) | 27.6 | 9.0 | 7.08 | 5.15 |
| 20 | 578 | 40 | 21.23 | 637 | (25) | 27.23 | 11.7 | 9.19 | 6.69 |

*one mil = 0.001 inch
D  distance from window to object (inches)
B  distance from the lens to the object (mm)
b  bar width (mils)
K  magnification
R  viewed range in mm (inch)
A  distance from the lens to the sensor (mm)
P14  size of a pixel image for sensors with 14 microns per pixel (like TCD1201)
P11  size of a pixel image for sensors with 11 microns per pixel (like TCD1250)
P8  size of a pixel image for sensors with 8 microns per pixel (like TCD1300)
lp  required lens resolution in line pairs per mm at 0 deg pitch and 50% modulation to read corresponding bar width b
lp@55  required resolution at 55 degree pitch and 50% modulation to read corresponding bar of width b @ 55

TABLE II

| D | b | b@20lp* | b@55 | lp | lp@55 |
|---|---|---|---|---|---|
| 1.5 | 4 | 3.11 | 2.3 | 15.6 | 27.1 |
| 3.0 | 5 | 4.55 | 2.9 | 18.2 | 31 |
| 6.0 | | 7.43 | 4.3 | 19.8 | 34.5 |
| | 7.5 | | | | |
| 15 | 20 | 16.1 | 11.5 | 16.1 | 28 |
| 20 | 40 | 20.1 | 23.0 | 10.5 | 18.2 | max variation of distance A is 14 mm

*b@20lp is the width of a bar which can be resolved with 50% modulation at distance D using a lens quality of twenty line pairs per millimeter (e.g., A=27.23, Table I), e.g., by virtue of a read only memory having this parameter stored therein as a start up value.

The microprocessor 30 may emit a pulse to the LED driver 44 of predetermined duration sufficient to create visible marker spots at a distance of twenty inches, but of brief duration to avoid detrimental blurring. The reflected light due to beams 51, 52 is evaluated based on the output from the image sensor 20. If the output from the sensor 20 resembles FIG. 3C, where pulses 61, 62 have a relatively close spacing (in time) Pc relative to total sensor readout time T, computer 30 could conclude that the focus adjustment was proper without activating stepping motor driver 34. In this case, with the beam sources 41, 42 de-energized, the clock buffers 26 could be activated to clear the image sensor 20 and effect a readout therefrom. The output from A/D converter 32 would then be analyzed by the microcomputer, and the corresponding rectangular waveform bar code signal (analogous to a conventional emulated wand bar code signal) could be transmitted to buffers component 60. If microprocessor 30 concluded that a valid bar code had been transmitted, or upon receiving a command from the host, microprocessor 30 could return to a standby or sleep mode, leaving the lens system at its existing position. In this case, since the stepper driver had not been actuated, the microcomputer would recognize that the lens adjustment remained at its initial value (A=27.23 mm, Table I), and this current lens adjustment value would be stored in a lens condition register (e.g., maintained by battery power while the reader remained in a standby mode).

Figure 3A:
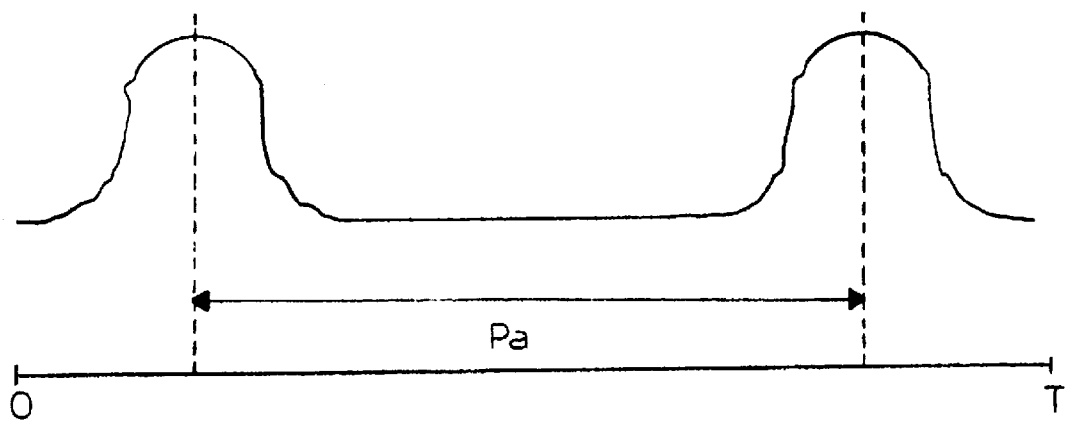
Figure 3B:
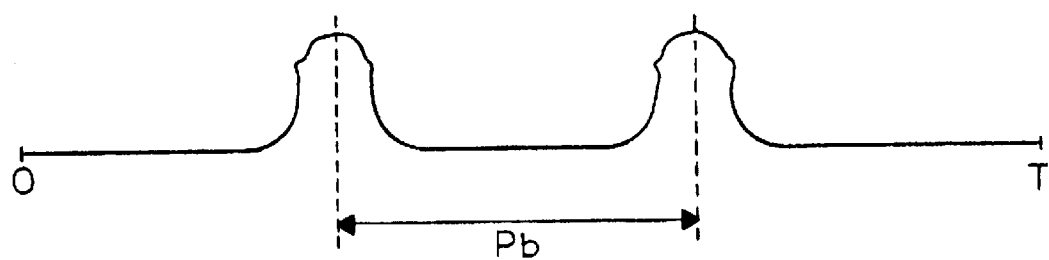
Figure 3C:
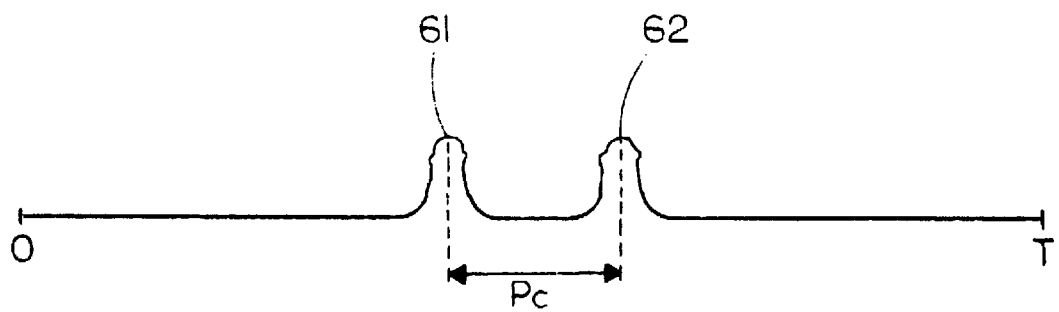

If the initial distance reading based on beams 51, 52 showed an output like FIG. 3A or FIG. 3B, the microprocessor would then activate stepper driver 34 to effect focus adjustment. At a later instant of time, the microprocessor could take a reading from sensor 20 with the beam sources 41, 42 off. Normally at this time, the user might not yet have aligned the reader with the bar code, but the output from converter 32 would provide information which could be used to determine whether the auxiliary light source 14 should be pulsed via lamp driver 16.

A next operation of the microcomputer might be either to again pulse beam sources 41, 42 to maintain the marker beam and distance monitor function, or to pulse the light source 14 and make a further attempt at a bar code reading. The driving pulse supplied to the light source 14 could have a time duration such as to provide for a valid bar code reading even with stepper motor 36 operating at top speed.

With each successive distance measurement with focus improving, the microprocessor 30 could refine the target lens adjustment. As such target focus condition was approached, the microcomputer would follow an optimum deceleration program to bring the lens system to a stop at an optimum focus position. As previously mentioned, the microprocessor would maintain a current register for lens focus position as pulses were supplied to the driver 34, and, for use in a subsequent reading operation, this register could then show the final position of the lens system where a valid bar code reading had been obtained.

From the foregoing, it will be understood that the microprocessor 30 is preferably programmed so as to provide periodic flashes of the beam sources 41, 42 while a reading operation is in progress so that the operator is adequately guided in aiming of the reader toward a bar code. Particularly when the motor 36 is operating at relatively high speed, the operation of auxiliary light source 14, where indicated, will be brief enough to avoid detrimental blur. To conserve battery power, the light source 14 is preferably only flashed, as may be needed, to verify the microcomputer's evaluation of operating conditions until such time that the microcomputer determines that proximity to optimum focus has been reached, e.g., where the object is located within the depth of focus of the lens system for the current lens system adjusted position.

In any case, the microprocessor may frequently examine the output of the image sensor 20 using ambient light during focus adjustments since this does not require the use of lamp driving power, and since the readings can provide useful information concerning the need for the auxiliary light source and/or supplemental information concerning the focus condition of the optical system. It is preferred, however, that bar code information only be sent to a host system where such information appears to represent valid bar code information which could be decoded by the host. An alternative would be for the microprocessor to decode the incoming signal from converter 32 prior to sending bar code information to the host. In this case, microprocessor 30 would generate a binary (rectangular waveform) bar code signal to represent the decoded data, or of course, merely send the bar code number as decoded.

When the reader system is deactivated, microprocessor 30 may activate the stepper motor 36 to place the lens system 22 in such initial condition, e.g., focused at a distance where the next label is most likely to be found based on the experience of the last few reading operations.

The following is a summary of the presently preferred sequence of steps to be taken by the system of FIG. 1 to achieve and maintain optimum focus (a mirror is moved to effect focusing e.g., as shown in FIGS. 6 and 7 to be described hereafter):

STEP (1) Power up, system initialization, the mirror moves to an initial position providing focus for remote zone (20 inches);

STEP (2) System receives first request to read label and the computer turns the pointing beams ON;

STEP (3) Image taken with pointing beams and the distance between the pointing beam centers of area is determined (the current range is calculated from the known function of the distance between the pointing beam centers of area);

STEP (4) A comparison of the focusing mirror's existing position with the desired focusing mirror position is made and the computer calculates the amount and direction of corrective motion and sends the necessary control signals to the motor driver;

STEP (5) An image of the object without the pointing beams is taken, processed and made available for decoding;

STEP (6) The cycle may be repeated in order to correct the focusing mirror position by taking an image with the pointing beams "ON" for remeasuring the interval between the spots (the computer recognizes the spot images since they are substantially different from bar-code pulses); and STEP (7) After successfully decoding label data, the reading system, including the microcontroller, goes into a power down mode for conserving the battery energy, leaving the focusing mirror in the latest position.

The next time the system is activated, it begins the cycle from the previous focusing position. The pointing beams may be generated by either bright visible LEDs or visible solid state lasers. Of course, both LEDs and lasers may be of an infrared type if their purpose would be limited only to range measurement.

A single beam (instead of the two beams used in the preferred embodiment) might also be used for the same purpose. The position of the center (of area of the image) of a single beam relative to a fixed point on the image sensor would then correspond with the distance to the target. However, a target surface pitch angle might produce an error since the point of impingement of a single beam might not represent the average distance of the label from the reader.

For optimum results two pointing beams are preferred. Two beams provide the computer with the information necessary to determine the distance to the target independently in two points, i.e., the centers of the two pointing spots. The distance between spots provides knowledge pertaining to the distance to the middle point between the spots, but if necessary, the individual distance to each spot may be determined and used for reading long labels at significant pitch angles by sequentially focusing at both halves and reconstructing the full label data.

Currently available visible LEDs may be utilized without additional lenses to distances of about 1 to 2 feet. If a longer range is desired, visible lasers or collimating lenses (external to LED) may be used. For cost reduction, two beams may be created with a single laser with a beam splitter and mirror.

Figure 5:
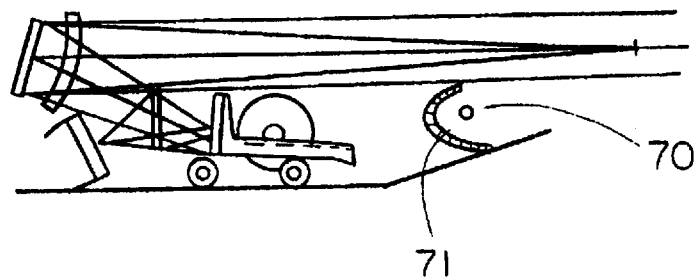
FIG. 5 is a side elevational view of an optical system configuration for adjustably imaging optically readable information on a reading sensor.

Exemplary Details of Auxiliary Light Source (FIG. 5)

While the light source 14 may be of the type disclosed in the aforementioned Laser et al. U.S. Pat. No. 4,570,057, it is conceived that the light source might comprise a tungsten wire 70 with an associated reflector 71 (as indicated in FIG. 5). Tension springs may act on the opposite ends of the wire in order to absorb the elongation of the wire when driven to emit a light pulse. Microcomputer 30 may monitor the pulse excitation of the wire 70 so as to take into account wire temperature during a further electric current pulse, and may further limit the duration of the electric current pulse to only that time interval required to produce the desired light output.

The type of auxiliary on-board light source may be, for example, either:

(1) an array of bright LEDs, (2) a long filament incandescent bulb powered in a supercharge mode, or (3) a strobe light.

The use of a long filament incandescent bulb, powered in a supercharge mode, has been tested. A significantly bright pulse of light may be regularly produced by applying a 2 ms pulse with a voltage eight times the nominal lamp voltage. The energy spent in such a pulse was determined to be 0.15 J. This approximates the same energy used by the strobe light found in the product described in Laser, et al., U.S. Pat. No. 4,570,057. Without undue testing, data may be determined regarding: (1) the necessary voltage and power requirement per pulse, (2) energy storage devices, (3) filament modification, and (4) bulb life.

Incandescent lamps are capable of producing pulses of light with durations in milliseconds. Incandescent lamps provide the following advantages: (1) small size, (2) power efficiency, (3) utilization with a concentrated flux and small reflector (a thin filament presents an accurate light source), (4) long life, (5) durability, (6) high energy flash output, and (7) the amount of light per pulse may be controlled.

Existing line filament lamps exhibit a typical life of between 1,000 to 25,000 hours. Even in pulse mode where lifetime would be reduced ten times, the number of 3 ms pulses available would be over 50 million.

Strobe lights are also commonly utilized as light sources. Strobe lights may be the best option where very fast label motion is required. In order to achieve a 10 inch per second non-blurred image speed (with a label having 5.0 mil bars) the CCD integration time should not exceed 250 microseconds. However, such an integration time is not a problem if an electronic shutter is utilized. In such a case, the required level of label illumination will be very high. The strobe light hardware described in the Laser, et al., U.S. Pat. No. 4,570,057 might be utilized for the instant application. Where fast label motion is required a customized xenon tube with a significantly reduced diameter would produce a much more accurate light beam that would be easy to form and direct efficiently. Such a customized xenon tube would reduce power consumption, component size, and provide an increased firing rate.

Exemplary Optical Systems (FIGS. 5, 6 and 7)

In an exemplary embodiment the lens 81 should be aspheric with an F-number of approximately five.

In such an embodiment the variable parameter for focusing is the distance between the sensor 82 and the lens 81. A light weight mirror 84 is inserted in the optical path between the sensor 82 and the lens 81 to serve two goals: (1) to shorten the required length of the housing, and (2) to alter the distance by moving a low mass component.

The second goal is the most critical of the two. For fast acting focusing mechanisms the amount of moving mass is a crucial consideration. In an exemplary embodiment the mirror 84 and supporting bracket 85 may be made as a single metallized plastic part with a mass of less than 0.5 grams. In the proposed mechanism, when the mirror moves toward the sensor, it slightly rotates counter-clockwise due to the difference in the distances between the top and bottom pairs of axes. This rotation helps to keep direction of view from changing in the plane perpendicular to the direction of CCD scanning. In an exemplary embodiment this rotational movement is accomplished by pivotally mounting the mirror support bracket 85 to a drive quadrant 86. The drive quadrant is drivably connected to a stepper motor 87.

A single photosensor array 82, mounted within a housing, is utilized for both ranging and imaging purposes. The housing includes a light receiving opening for alignment with optical information or the like. Optical means are associated with the array 82 such that the image of optical information may be focused on the array 82.

The optical means includes a lens 81 associated with a primary mirror 83 (FIG. 5, 6, and 7). Light entering the housing through the opening is refracted by the lens 81 onto the primary mirror 83. Light refracted by the lens 81 onto the primary mirror 83 is then reflected back through the lens 81 onto the focusing mirror 84.

The focusing mirror 84 may be adjusted such that both the angle of separation and distance between the mirrors may be changed (FIG. 6 and 7). The focusing mirror 84 is held by the bracket 85 which is pivotably connected to a drive quadrant 86. Rotation of a drive motor shaft causes the position of the focusing mirror 84 to change in relation to the array 82 (FIG. 6 and 7).

In operation, the image of a bar code, or the like, is focused from any distance, within a substantial range of distances, onto the array 82 by operation of the stepper motor 87.

Exemplary Details for Distance Measurement and Autofocus Control

An ultra high brightness LED is preferably used for distance measurement. Such an LED is commercially available as part AND190CRP from AND Corporation of Burlingame, California. The AND190CRP may be utilized in pulse mode. In pulse mode current may be increased up to ten times in order to achieve a corresponding increase in brightness. Since available power is limited to five volts, a current increase of three to four times may be expected in pulse mode.

Mirror positioning might be based on a number of approaches. The auto-focusing algorithm may have several branches with various priorities depending on the instant situation.

Focusing data might be derived from the distance between the two red pointer spots. With a pair of "Kilobright" LEDs the narrow beams could be turned on and off during alternate scans so the image could be taken with or without the LED beams.

Another source of focusing information might be derived from an analysis of sensor data. In a first case the steepness of slopes may be studied for deciding which direction to drive the focusing mirror. In a second case, especially when a label like pattern is scanned, the modulation coefficient for different pulse widths could be measured and then compared with a similar measurement of a following scan.

In order to stay away from the need to recognize particular pulses or pulse sequences in different scans (which were taken in different points of time) the processed data could be sorted statistically in histograms, representing distribution of modulations in the pulse width domain. Then particular groups of pulse widths could be identified in different scans and their average modulations compared. This comparison would provide focusing quality (FQ) criteria. The computer could trace the history of FQ and make decisions regarding the amount and direction of focusing movement.

Methods of Determining Focusing Quality

Automatic focusing of a barcode reading system may be accomplished by analyzing, in real time, certain qualities of an image signal produced by a CCD sensor. A numerical value may be calculated to provide the quantitative estimate of the focusing accuracy Q. This focus criterion Q may then be used to estimate the amount of adjustment necessary to achieve an optimum focus. The following three methods may be used for determining Q.

1. Contrast Gradient

Slopes of pulses represent transitions from dark to bright and are steeper for sharp images. The microprocessor 30 may determine the sharpest slope in a scan and record its value in volts per pixel. The slope rate is a function of focus quality. The slope rate function may be reshaped into a Q value by using a table.

2. Distribution of Modulations

Since the MTF (modulation transfer function) of all optical systems changes shape significantly depending on the position of best focus relatively to the position of an object, the degree of modulation of pulses present in a bar code image signal depends on the width of those pulses.

Depending on the speed performance of the utilized processor, either a portion or entire length of a data string may be used for analysis. The modulations for each bar in an area of interest may be measured as:

$$m = A/E$$

where:
A is an amplitude of a pulse, measured from its root to peak value, and
E is an average of peak values for bright and dark pulses in the area of interest.

In an exemplary embodiment modulations may be stored temporarily along with values of corresponding widths. All pulses may then be sorted into two groups, e.g., a narrow pulse group and a wide pulse group. The limit between the groups may be calculated as:

$$W1 = kWs$$

where:
W1 is the largest width permitted for the narrow group,
W2 is the shortest pulse width in a scan, and
k is an empirically adjusted coefficient equal to 2.5 ±0.5.

The average modulations for each group ($M_n$ for a narrow and $M_w$ for a wide group) may then be calculated.

Finally, focusing quality $Q_m$ may be derived through modulation measurements as:

$$Q_m = M_n/(M_w \times W1)$$

Since this value is statistical in nature, normalized for average brightness, the value does not depend on the signal or content of the image.

3. Dispersion of Extremes

An alternate method of focus quality measurement is based on the measurement of the dispersion of extreme values. This method is also statistical in nature and based on the fact that in an image, consisting of pulses of various widths the amplitudes of short pulses degrade faster then the amplitudes of wider pulses as image focus quality decreases. Thus, amplitudes become wider as focus quality decreases. Focus quality under this method may be calculated as:

$$Q_a = \Sigma(B_i - B_o)/nB_o + \Sigma(D_i - D_o)/nD_o$$

Where $Q_a$ is a measure of focus quality which represents a normalized dispersion of the extreme values of a signal. Without loss of functionality the squaring of deviations may be omitted in order to increase processing speed.

$B_i$ is a current extreme value of a bright pulse,
$B_o$ is an average value of bright extremes $((1/n)\Sigma A_i)$,
$D_i$ is a current extreme value of a dark pulse,
$D_o$ is an average value of dark extremes $((1/n)\Sigma B_i)$, and
n is the number of pulse pairs.

This simple and fast method can give reliable results when the number of pulses exceeds some minimum (obviously, for a single pulse the dispersion is nil).

Figure 8:
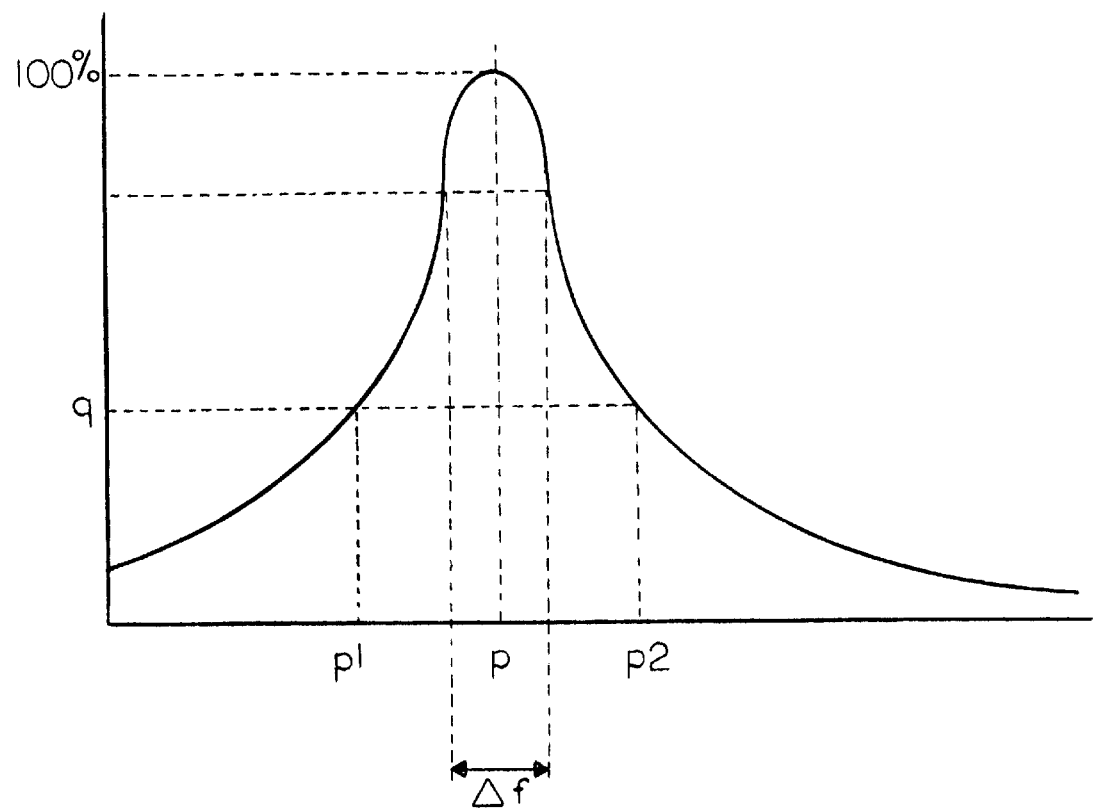
FIG. 8 is a graphical representation of a focus quality gradient.

For any particular position of a focus adjusting mechanism the focus quality depends on the position of an object. FIG. 8 shows a typical curve. When an object is in the best focus position (p), focus quality reaches its maximum, Q=100%. At any other position of the object, the focus quality decreases. Since a small decreases in focus quality do not diminish image quality below that necessary for successful decoding, a depth of focus zone ($\Delta$ f) around the best focus (p) position may be used.

Even though this function exhibits duality, it is still very useful for determining the position of the best focus by measuring its value at a current position, e.g., if it is possible to measure a current value q of the focus quality function in the current position of the focusing mechanism (p1 or p2) then the distance to the best position p may be found, and the duplicity problem could be resolved by tracing the direction and result of a previous move.

The function of focus quality very often is described in terms of a modulation transfer function, which gives a complete characterization of the quality of image produced by an optical system in a given focusing situation.

Figure 9B:
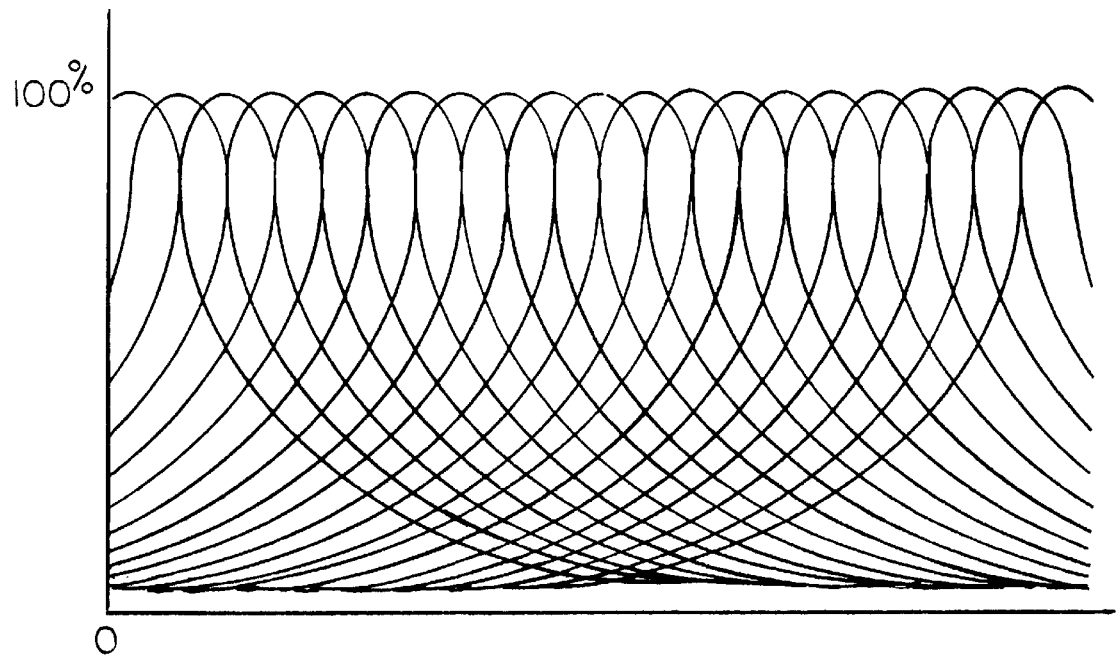
FIGS. 9A and 9B are graphical representations of a family of overlapping focus quality functions for a number of equally spaced positions of a focusing mechanism.
Figure 9A:
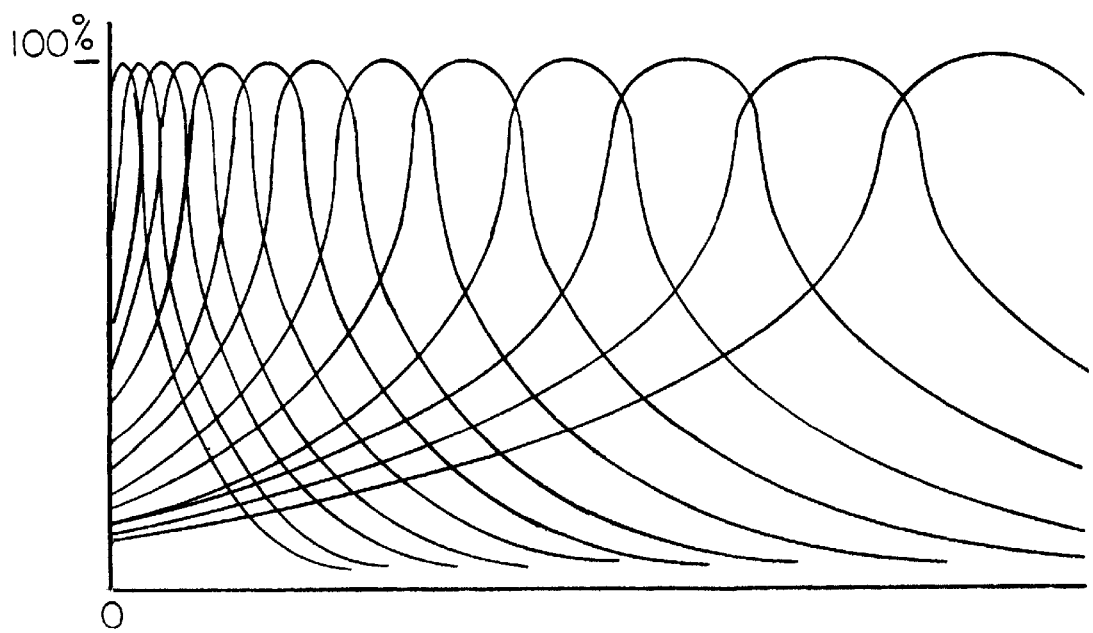

FIG. 9A and FIG. 9B illustrate a family of overlapping focus quality functions for a number of equally spaced positions of a focusing mechanism.

It should be apparent that bar code density must decrease as distance is increased. The further the target with a label, the wider the minimum bar (or space) of a bar code. This corresponds with the function of a fixed focal length lens where the distance from the lens to the sensor is adjustable for focusing.

FIG. 9A best illustrates focus quality as the position of best focus moves towards longer ranges. However, the focusing mechanism would move an equal amount (for example 3 steps of a stepper motor) between each of the shown positions. Correspondingly, in the image space (space between the lens and the sensor) projections of these focus quality functions (representing acceptable depths of field at various ranges) all the curves will be about the same and equally spaced, as shown on the FIG. 9B. This adds to the simplicity of the focusing mechanism design.

Summary of FIGS. 10A to 48

Figure 10A:
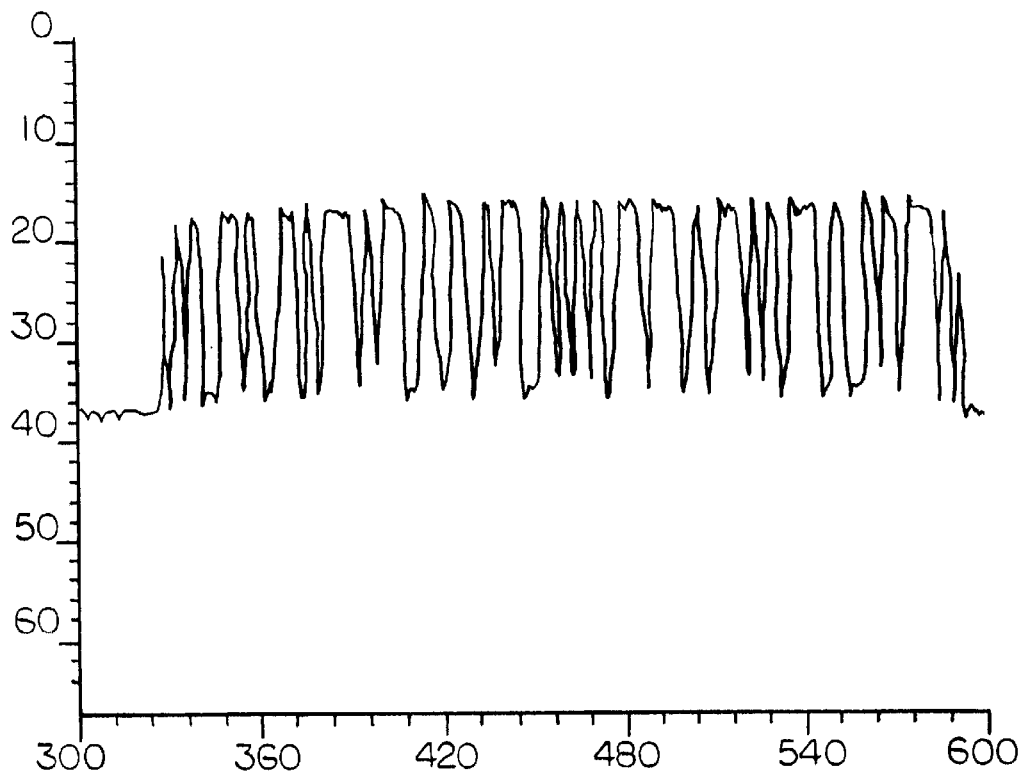
FIGS. 10A and 10B are graphical representations of waveforms illustrating the output of a CCD image sensor.
Figure 10B:
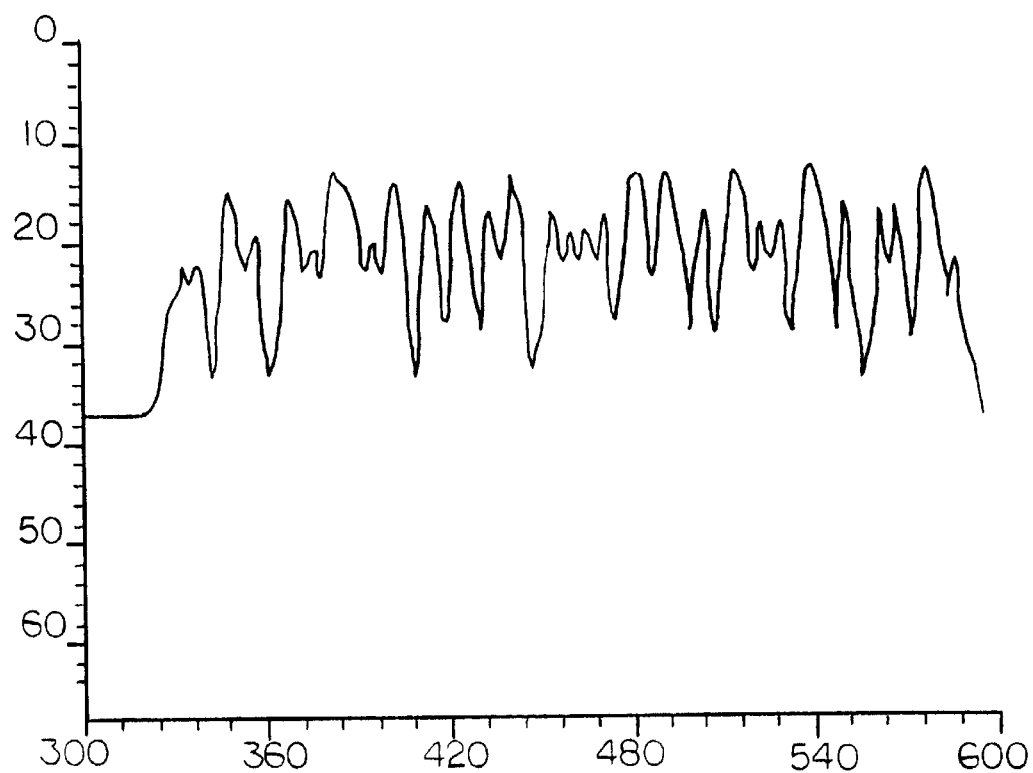

FIGS. 10A and 10B are graphical representations of waveforms illustrating the output of a CCD image sensor.

Figure 11:
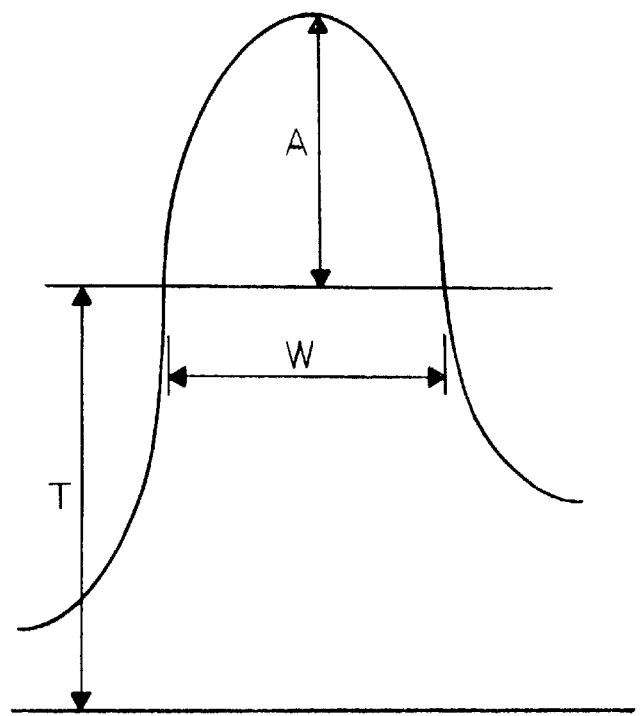
FIG. 11 is a graphical representation of a waveform wherein W is the pulse width at a threshold level, T is the pulse threshold level, and A is the pulse amplitude.

FIG. 11 is a graphical representation of a waveform wherein W is the pulse width at a threshold level, T is the pulse threshold level, and A is the pulse amplitude.

FIG. 12 is a graphical representation illustrating the separation of incident LED spot images on white paper in pixels versus object position in motor steps wherein: line (1) defines this function where the lens position is zero; line (2) defines this function where the lens position is located at 20 motor steps; and line (3) defines this function where the lens position is located at 40 motor steps.

FIG. 13 is a graphical representation of the waveform of the LED spots superimposed on a focused barcode, wherein LED spot centers were located at 285 and 652; FIG. 14 is a graphical half-scale representation of the waveform of FIG. 13 wherein the waveform has been processed.

FIG. 15 is a graphical representation of a focus quality gradient wherein the focus quality of an object located at a position 12 inches from the invention is shown at varying lens positions as determined by (1) a pulse modulation algorithm, (2) a maximum slew rate algorithm, and (3) a maximum slew rate algorithm wherein the signal of every 10 pixels is averaged.

FIG. 16 is a graphical representation of a focus quality gradient utilizing a pulse modulation algorithm wherein the lens was focused at 9 inches, 13 inches, and 20 inches respectively.

FIG. 17 is a is a graphical representation of a focus quality gradient wherein the focus quality of an object located at a position 20 inches from the invention is shown at varying lens positions as determined by (1) a pulse modulation algorithm, (2) a maximum slew rate algorithm, and (3) a maximum slew rate algorithm wherein the signal of every 10 pixels is averaged.

FIG. 18 is a graphical representation of a focus quality gradient wherein the focus quality of an object located at a position 2 inches from the invention is shown at varying lens positions as determined by (1) a pulse modulation algorithm, (2) a maximum slew rate algorithm, (3) a maximum slew rate algorithm wherein the signal of every 10 pixels is averaged, and (4) a relative length of curve algorithm.

FIG. 19 is a graphical representation of a focus quality gradient wherein the focus quality of an object located at a position 4 inches from the invention is shown at varying lens positions as determined by (1) a pulse modulation algorithm, (2) a maximum slew rate algorithm, and (3) a maximum slew rate algorithm wherein the signal of every 10 pixels is averaged.

FIG. 20 is a graphical representation illustrating the separation of incident LED spot images on a bar code label in pixels versus object position in motor steps wherein: line (1) defines this function where the lens position is zero; line (2) defines this function where the lens position is located at 20 motor steps; and line (3) defines this function where the lens position is located at 40 motor steps.

FIG. 21 is a graphical representation of the waveform of two LED spot images superimposed, slightly out of focus, and incident on a dense bar code label wherein the lens was located at 40 steps and the label was located at 38 steps (illuminations was high with peaks detected at 326, 576).

FIG. 22 is a graphical representation of the waveform of two LED spot images superimposed, out of focus, and incident on a dense bar code label wherein the lens was located at 40 steps and the label was located at 30 steps (illuminations was high with peaks detected at 271, 644).

FIG. 23 is a graphical representation of the waveform of two LED spot images superimposed, in focus, and incident on a dense bar code label wherein the lens was located at 30 steps and the label was located at 30 steps (illuminations was high with peaks detected at 288, 646).

FIG. 24 is the processed scan illustrated by FIG. 23 showing the uneven illumination of the bar code label.

FIG. 25 is a graphical representation of the waveform of two LED spot images superimposed, out of focus, and incident on a dense bar code label wherein the lens was located at 30 steps and the label was located at 20 steps (peaks detected at 198, 723).

FIG. 26 is a graphical representation of the waveform of two LED spot images superimposed, in focus, and incident on a dense bar code label wherein the lens was located at 20 steps and the label was located at 20 steps (peaks detected at 195, 738).

FIG. 27 is a graphical representation of the waveform of two LED spot images superimposed, out of focus, and incident on a dense bar code label wherein the lens was located at 20 steps and the label was located at 10 steps (peaks detected at 114, 813).

FIG. 28 is a graphical representation of the waveform of two LED spot images superimposed, in focus, and incident on a dense bar code label wherein the lens was located at 10 steps and the label was located at 10 steps (peaks detected at 107, 831).

FIG. 29 is a graphical representation of the waveform of two LED spot images superimposed, out of focus, and incident on a dense bar code label wherein the lens was located at 0 steps and the label was located at 10 steps (peaks detected at 84, 843).

FIGS. 30 and 31 are side elevational views of a preferred optical system utilizing a moveable prism.

FIGS. 32, 33, and 34 are graphical representations of focus quality gradients prepared using a pulse modulation algorithm wherein the lens was focused at 18 inches, 9 inches, and 13 inches respectively.

FIGS. 35, 36, 37, and 38 are graphical representations of the waveform of a reflected light image of a bar code label wherein illumination was constant and focus quality was changed.

FIG. 39, 40, and 41 are graphical representations of the waveform of a reflected light image of a bar code label wherein focus quality was constant and illumination was changed.

FIG. 42 is a graphical representation of a focus quality gradient wherein the focus quality of an object located at a position 20 inches from the invention is shown at varying lens positions as determined by (1) a pulse modulation algorithm, (2) a maximum slew rate algorithm, (3) a maximum slew rate algorithm wherein the signal of every 10 pixels is averaged, and (4) a relative length of curve algorithm.

FIG. 43 is a graphical representation of a focus quality gradient wherein the focus quality of an object located at a position 5 inches from the invention is shown at varying lens positions as determined by (1) a pulse modulation algorithm, (2) a maximum slew rate algorithm, (3) a maximum slew rate algorithm wherein the signal of every 10 pixels is averaged, and (4) a relative length of curve algorithm.

FIG. 44 is a graphical representation of a focus quality gradient wherein the focus quality of an object located at a position 2 inches from the invention is shown at varying lens positions as determined by (1) a pulse modulation algorithm, (2) a maximum slew rate algorithm, (3) a maximum slew rate algorithm wherein the signal of every 10 pixels is averaged, and (4) a relative length of curve algorithm.

FIGS. 45–48 depict a flow diagram of an exemplary instruction set to be used by the microprocessor to carry out the processes of an exemplary embodiment of the present invention.

Description of the Microfiche Appendix

Made available pursuant to 37 CFR § 1.96 is a microfiche appendix of the source code of an exemplary set of programs capable of operating an exemplary apparatus of the present invention. Appendix A is a listing of "SET.INC" which provides the default settings of an exemplary embodiment of the present invention;

Appendix B is a listing of "GLOBAL.INC" which provides certain global operating settings;

Appendix C is a listing of "VARS.INC" which provides memory addresses for certain variables;

Appendix D is a listing of "CALC_POS.ASM" which calculates which position to move the lens system based upon LED distance and the current motor position;

Appendix E is a listing of "CRIT_RD.ASM" which configures RAM memory and control;

Appendix F is a listing of "EEPROM.ASM" which controls all EEPROM activities;

Appendix G is a listing of "EXTRMPRC.ASM" which is called each time an extreme has been located in order to extract transition position;

Appendix H is a listing of "IMG_PROC.ASM" which is called in order to take and process an image for transition;

Appendix I is a listing of "IMG_READ.ASM" which creates two circular buffers which are utilized in taking and processing images in transition;

Appendix J is a listing of "INIT.ASM" and "MAINLINE.ASM" which provide certain debugging routines;

Appendix K is a listing of "MOTOR.ASM" which selects a period of time to wait between changing motor phases;

Appendix L is a listing of "RAPID_R.ASM" which when called reads the A/D converter;

Appendix M is a listing of "READ_LED.ASM" which provides exposure control tuning;

Appendix N is a listing of "SERVICE.ASM" which allows on the fly exposure control adjustments;

Appendix O is a listing of "TO_HOST.ASM" which provides all transmit-to-host related activities;

Appendix P is a listing of "TRANSPRCS.ASM" which reprocesses the array of transition positions; and Appendix Q is a listing of "VIDEO.ASM" which collects everything necessary to take and process the image for transition.

While the invention has been described with a certain degree of particularity, it is manifest that many changes may be made in the details of construction and the arrangement of components without departing from the spirit and scope of the disclosure. It is understood that the invention is not limited to the embodiments set forth herein for purposes of exemplification, but is to be limited only by the scope of the appended claims including the full range of equivalency to which each element thereof is entitled.

Thus, there has been shown and described an improved portable optical reader system for reading optical information over a substantial range of distances which accomplishes at least all of the stated objects.

I claim:

1. A portable optical reader system for reading optical information over a substantial range of distances, comprising:

(a) a casing having a light receiving opening for alignment with optical information to be read;
    (b) optical means comprising reflected light collecting means for forming a reflected light image and reading sensor means for converting a reflected image of optical information into an information signal, said optical means being adjustable such that said collection means tends to focus a reflected light image of optical information located within said substantial range of distances onto said reading sensor means;
    (c) light beam generating means associated with said casing and directed relative to said optical means and said light receiving opening such that a light beam generated thereby will impinge on an information carrier having optical information to be read and will be reflected therefrom through said light receiving opening and via said collecting means to said reading sensor means, the position of impingement of the reflected light beam on said reading sensor means being a function of the range of the information carrier from said image sensor; and
    (d) control means for adjusting said optical means to tend to focus a reflected light image of optical information associated with the information carrier at least in part in accordance with the position of impingement of the reflected light beam on said reading sensor means.

2. The portable optical reader system of claim 1, wherein said reading sensor means comprises a solid state photoelectric sensor array capable of resolving elements of optically readable information simultaneously incident thereon.

3. The portable optical reader system of claim 1, wherein said optical means includes at least one lens.

4. The portable optical reader system of claim 3, wherein said optical means further includes a first mirror for collecting light from said lens and reflecting said light.

5. The portable optical reader system of claim 4, wherein said optical means further includes a movable mirror for effecting focusing of light reflected from said first mirror onto said sensor means.

6. The portable optical reader system of claim 5, wherein said optical means further includes means for adjustable moving said movable mirror in relation to said sensor means without changing the aiming axis of the optical means which is to be aligned with the optical information.

7. The portable optical reader system of claim 6, wherein said movable mirror is adjustably movable about at least one axis.

8. The portable optical reader system of claim 6, wherein said movable mirror is adjustably movable about at least two axes.

9. The portable optical reader system of claim 1, wherein said control means controls movement of said sensor means to effect focusing of the reflected light image.

10. The portable optical reader system of claim 1, wherein said lens means comprises a lens, and a lens system component, and said control means controls movement of at least one of said lens and said lens system component to effect focusing of the reflected light image.

11. The portable optical reader system of claim 1, wherein said optical means comprises:

a lens associated with said casing; and
    a mirror mounted within said casing such that light entering said light
    receiving opening passes twice through said lens.

12. The portable optical reader system of claim 1, further comprising: a carriage having a focus adjusting mirror movable therewith to effect focusing; pivot means for pivotably connecting said carriage to said casing; drive linkage means associated with said carriage; and electric motor means for drivingly moving said carriage about at least two axes via said drive linkage means.

13. The portable optical reader system of claim 1, further comprising: a carriage having a focus adjusting mirror movable therewith to effect focusing; drive means for movably adjusting said carriage relative to casing; and cam means associated with said carriage such that said carriage moves said focus adjusting mirror about at least two axes during movable adjustment of said carriage.

14. A portable optical reader system for reading optical information over a substantial range of distances, comprising:

(a) a casing having an opening for facing optical information;

(b) adjustable optical means, disposed in said casing, for imaging at a predetermined reading position in said casing an image of optically readable information facing said opening by light reflected therefrom, said information located on the surface of an optically readable information carrier;

(c) reading sensor means, disposed at said predetermined reading position and having a light receiving plane, for converting an image into an electric signal;

(d) means for emitting a light beam, positioned in said casing, such that said light beam is reflected from a surface of an optically readable information carrier without being refracted by said optical means, said carrier at an unknown distance from the plane of said reading sensor means, such that said reflected light beam is refracted by said optical means onto the plane of said reading sensor means such that the optically refracted and reflected light beam is converted into an electric signal;

(e) means for obtaining a measure of any needed focus adjustment based in part on said electric signal produced by said reading sensor means from the refracted light beam reflected from said carrier surface, said measure of any needed focus adjustment including an indication of the direction and the distance to adjust said optical means;

(f) means for adjusting said optical means in accordance with said measure of needed focus adjustment such that said optical means focuses the image of optically readable information, located on the surface adjacent said information carrier, at said predetermined reading position; and (g) means for producing a digital information set corresponding to the image of said optically readable information focused at said predetermined reading position.

15. A method of determining focusing quality according to a contrast gradient, comprising:

(a) reflecting a light beam from an object having an image to be focused;

(b) optically directing the image of said reflected light beam such that said light beam impinges on the surface of a photosensitive array;

(c) processing the output of said photosensitive array such that an image contrast gradient is determined; and (d) focusing said image with said contrast gradient wherein focus quality is a function of the slope rate of the contrast gradient.

16. A method of determining focusing quality according to a distribution of modulations, comprising:

(a) optically directing the image of an object to be focused such that the reflected light image of said object impinges on the surface of a photosensitive array;

(b) determining the modulation transfer function of at least certain areas of the image of said object from the output of said array;

(c) sorting the pulse modulations of said at least certain areas of the image of said object by pulse width;

(d) separating the sorted pulse modulations into a group of narrow pulse widths and a group of wide pulse widths;

(e) calculating the average pulse modulation of each group; and (f) focusing said image with said average pulse modulation for each group wherein focus quality is a function of the ratio of the narrow pulse width group and wide pulse width group.

17. A method of determining the focusing quality of an image of pulses of various widths, comprising:

(a) optically directing the image of an object to be focused such that the reflected light image of said object impinges on the surface of a photosensitive array;

(b) determining the extreme values of bright pulses ($B_i$) and dark pulses ($D_i$) of the image of said object from the output of said array;

(c) determining the average values of bright extremes ($B_o$) and dark extremes ($D_o$);

(d) determining the number of pulse pairs (n);

(e) statistically evaluating said pulse data according to the following expression:

$$Q_a = \Sigma(A_i - A_o)/nA_o + \Sigma(B_i - B_o)/nB_o$$

wherein:

$Q_a$ is a measure of focus quality, $A_i$ is a current extreme value of a bright pulse, $A_o$ is an average value of bright extremes $((1/n)\Sigma A_i)$, $B_i$ is a current extreme value of a dark pulse, $B_o$ is an average value of dark extremes $((1/n)\Sigma B_i)$, and n is the number of pulse pairs.

18. The method of determining focusing quality of claims 15, 16, or 17, further comprising the step of controlling the signal level of said array output such that said signal is maintained within a dynamic range.

* * * * *